(12) United States Patent
Sugio et al.

(10) Patent No.: US 10,701,448 B2
(45) Date of Patent: *Jun. 30, 2020

(54) VIDEO DELIVERY METHOD FOR DELIVERING VIDEOS CAPTURED FROM A PLURALITY OF VIEWPOINTS, VIDEO RECEPTION METHOD, SERVER, AND TERMINAL DEVICE

(71) Applicant: PANASONIC INTELLECTUAL PROPERTY MANAGEMENT CO., LTD., Osaka (JP)

(72) Inventors: Toshiyasu Sugio, Osaka (JP); Toru Matsunobu, Osaka (JP); Junichi Fujihira, Kanagawa (JP); Natsuki Nagamori, Kanagawa (JP); Seiji Higuchi, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/997,022

(22) Filed: Jun. 4, 2018

(65) Prior Publication Data

US 2018/0288485 A1    Oct. 4, 2018

Related U.S. Application Data

(63) Continuation of application No. 14/968,949, filed on Dec. 15, 2015, now Pat. No. 10,015,551.
(Continued)

(30) Foreign Application Priority Data

Aug. 31, 2015    (JP) .................................. 2015-171538

(51) Int. Cl.
*H04N 21/475* (2011.01)
*H04N 21/218* (2011.01)
(Continued)

(52) U.S. Cl.
CPC ..... *H04N 21/4756* (2013.01); *G06K 9/00711* (2013.01); *G06K 9/3241* (2013.01);
(Continued)

(58) Field of Classification Search
CPC .......... H04N 21/4756; H04N 21/4325; H04N 21/4668; H04N 21/252; H04N 21/21805;
(Continued)

(56) References Cited

U.S. PATENT DOCUMENTS 5,894,320 A    4/1999   Vancelette
6,144,375 A   11/2000   Jain
(Continued)

FOREIGN PATENT DOCUMENTS

JP    2009-206625        9/2009
JP    2009-296536 A     12/2009
(Continued)

OTHER PUBLICATIONS

Tomiyasu et al., "Multi-View Video Viewing System by Viewpoint Recommendation for Target Tracking Viewing", Interaction 2014, Information Processing Society of Japan, published on Mar. 1, 2014, pp. 290-295.

*Primary Examiner* — Cynthia M Fogg
(74) *Attorney, Agent, or Firm* — Greenblum & Bernstein, P.L.C.

(57) ABSTRACT

A terminal and method for receiving a video delivery of a video signal are provided. The method includes receiving, from a server, the video signal for successively replaying a set of videos selected from among a plurality of videos. The selected videos are respectively selected for each of a
(Continued)

plurality of periods in accordance with rating values of the plurality of videos. The rating values are given by a plurality of users. The plurality of videos is obtained by taking an identical scene from a plurality of different viewpoints over a plurality of successive periods. The method further includes successively replaying the selected videos in accordance with the video signal, displaying any video among the plurality of videos, and further displaying when any subject is selected by a user from among a plurality of subjects included in the displayed video, a menu for rating the selected subject.

22 Claims, 23 Drawing Sheets

Related U.S. Application Data

(60) Provisional application No. 62/096,883, filed on Dec. 25, 2014.

(51) Int. Cl.
| | | |
|---|---|---|
| *G06K 9/32* | (2006.01) | |
| *G06K 9/00* | (2006.01) | |
| *H04N 21/25* | (2011.01) | |
| *H04N 21/466* | (2011.01) | |
| *H04N 21/432* | (2011.01) | |
| *H04N 21/234* | (2011.01) | |

(52) U.S. Cl.
CPC ..... *H04N 21/21805* (2013.01); *H04N 21/252* (2013.01); *H04N 21/4325* (2013.01); *H04N 21/4668* (2013.01); *H04N 21/23418* (2013.01)

(58) Field of Classification Search
CPC ......... H04N 21/23418; H04N 21/4223; H04N 21/44008; H04N 21/2387; H04N 5/247; H04N 13/243; H04N 21/4758; H04N 21/25891; H04N 19/172; H04N 21/23424; H04N 21/2665; H04N 5/44543; G06K 9/3241; G06K 9/00711; G06F 3/04842

USPC .......................................................... 725/32
See application file for complete search history.

(56) References Cited

U.S. PATENT DOCUMENTS

| | | | |
|---|---|---|---|
| 2001/0043795 A1* | 11/2001 | Wood .................. | G11B 27/034 386/239 |
| 2002/0199186 A1* | 12/2002 | Ali ....................... | G11B 27/105 725/28 |
| 2004/0261127 A1 | 12/2004 | Freeman | |
| 2006/0130121 A1 | 6/2006 | Candelore | |
| 2007/0279494 A1* | 12/2007 | Aman .................. | G01S 3/7864 348/169 |
| 2008/0178232 A1* | 7/2008 | Velusamy .......... | H04N 5/23203 725/88 |
| 2009/0298564 A1* | 12/2009 | Walker ............... | A63B 71/0616 463/7 |
| 2010/0079670 A1* | 4/2010 | Frazier ............... | H04N 5/44591 348/564 |
| 2012/0069162 A1 | 3/2012 | Ota et al. | |
| 2012/0098925 A1 | 4/2012 | Dasher | |
| 2012/0113264 A1* | 5/2012 | Moshrefi ................ | H04H 20/38 348/157 |
| 2012/0188452 A1 | 7/2012 | Keiser | |
| 2012/0192242 A1* | 7/2012 | Kellerer .................. | G06F 16/78 725/116 |
| 2014/0168442 A1 | 6/2014 | Solomon | |
| 2014/0245367 A1* | 8/2014 | Sasaki ................ | H04N 21/4402 725/109 |
| 2014/0270706 A1 | 9/2014 | Pasko | |
| 2015/0135218 A1* | 5/2015 | You .................... | H04N 21/4751 725/40 |
| 2015/0222815 A1 | 8/2015 | Wang | |

FOREIGN PATENT DOCUMENTS

| | | |
|---|---|---|
| JP | 2012-070116 A | 4/2012 |
| JP | 2012-094990 | 5/2012 |
| JP | 2013-051552 A | 3/2013 |
| JP | 2014/215828 A | 11/2014 |

\* cited by examiner

VIDEO DELIVERY METHOD FOR DELIVERING VIDEOS CAPTURED FROM A PLURALITY OF VIEWPOINTS, VIDEO RECEPTION METHOD, SERVER, AND TERMINAL DEVICE

CROSS REFERENCES TO RELATED APPLICATIONS

This Application is a continuation application of the pending U.S. patent application Ser. No. 14/968,949, filed on Dec. 15, 2015, which claims priority from Provisional Application No. 62/096,883, filed on Dec. 25, 2014, and Japanese Patent Application No. 2015-171538, filed on Aug. 31, 2015, the contents of which are hereby incorporated by reference in their entireties.

BACKGROUND

1. Technical Field

The present disclosure relates to a video delivery method for delivering videos captured from a plurality of viewpoints, a video reception method, a server, and a terminal device.

2. Description of the Related Art

As a video delivery method, a technique described in Japanese Unexamined Patent Application Publication No. 2009-206625 is available, for example. Further, a video delivery method for delivering a video captured from a plurality of viewpoints is available (for example, see Japanese Unexamined Patent Application Publication No. 2012-094990). In these video delivery methods, a user is able to specify and view any video from among a plurality of videos obtained by shooting a specific scene from different viewpoints.

It is desired that the video delivery methods enable delivery of a suitable video on the basis of a plurality of videos.

SUMMARY

One non-limiting and exemplary embodiment provides a video delivery method, a video reception method, a server, or a terminal device with which it is possible to deliver a suitable video on the basis of a plurality of videos.

In one general aspect, the techniques disclosed here feature a method comprising: obtaining a plurality of videos by taking an identical scene from a plurality of different viewpoints over a plurality of successive periods; selecting a first selected video from among the plurality of videos for each of the plurality of periods to select a plurality of first selected videos in accordance with rating values of the plurality of videos, the rating values being given by a plurality of users; and transmitting from a server to a terminal device, a first video signal for successively replaying the plurality of first selected videos respectively selected for the plurality of periods.

The present disclosure is able to provide a video delivery method, a video reception method, a server, or a terminal device with which it is possible to deliver a suitable video on the basis of a plurality of videos.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
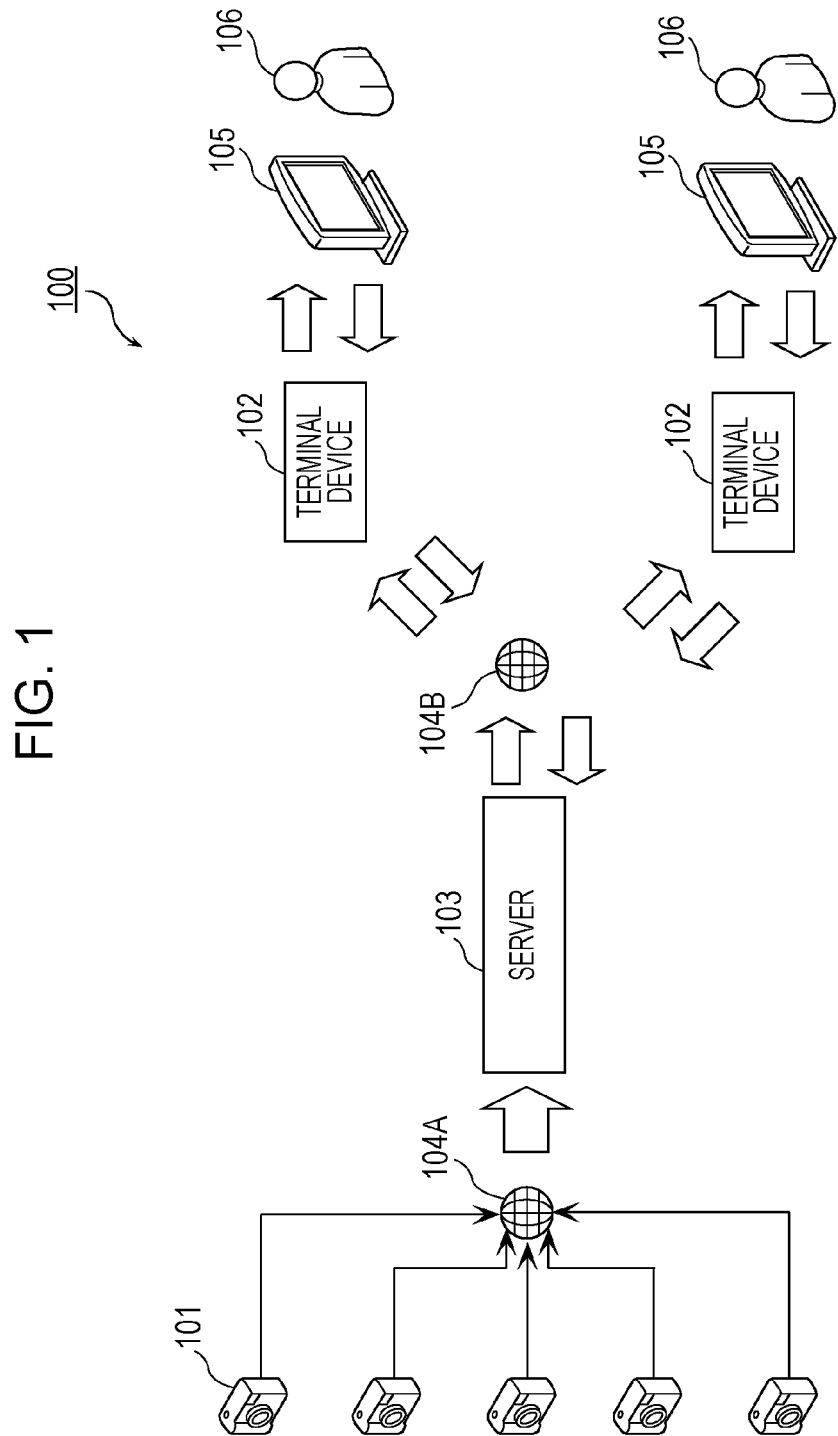
FIG. 1 is a diagram illustrating a configuration of a video delivery system according to a first embodiment.

A video delivery method according to an aspect of the present disclosure is a video delivery method for a server that delivers to a terminal device a first video signal based on a plurality of videos obtained by shooting an identical scene from a plurality of different viewpoints over a plurality of successive periods, the method including: selecting a first selected video from among the plurality of videos for each of the plurality of periods in accordance with rating values of the plurality of videos, the rating values being given by a plurality of users; and transmitting to the terminal device the first video signal for successively replaying a plurality of first selected videos respectively selected for the plurality of periods.

Accordingly, with the video delivery method, it is possible to deliver a suitable video based on ratings given by a plurality of users.

For example, each of the rating values may be a rating value of each of the plurality of videos, and in the selecting of the first selected video, for each period among the plurality of periods, a video having a highest rating value or having a rating value higher than a predetermined value in the period may be selected from among the plurality of videos as the first selected video.

Accordingly, with the video delivery method, it is possible to deliver a video for successively replaying highly rated viewpoint videos on the basis of ratings given by a plurality of users.

For example, each of the rating values may be a rating value of each of a plurality of subjects included in the plurality of videos, and in the selecting of the first selected video, for each of the plurality of periods, a video in which a recommended subject having a highest rating value or having a rating value higher than a predetermined value is visible may be selected from among the plurality of videos as the first selected video.

Accordingly, with the video delivery method, it is possible to deliver a video for successively replaying viewpoint videos in which a highly rated subject is visible on the basis of ratings given by a plurality of users.

For example, in the selecting of the first selected video, for each of the plurality of periods, a video in which the recommended subject has a largest area may be selected from among the plurality of videos as the first selected video.

Accordingly, with the video delivery method, it is possible to deliver a video for successively replaying viewpoint videos in which a highly rated subject is visible in a close-up manner on the basis of ratings given by a plurality of users.

For example, the video delivery method may include, in a case where the first video signal has an amount of data larger than an upper limit based on a reception band of the terminal device, selecting a second selected video from among the plurality of videos for each of the plurality of periods in accordance with the rating values of the plurality of videos; and transmitting to the terminal device a second video signal for successively replaying a plurality of second selected videos respectively selected for the plurality of periods. At least one of the plurality of second selected videos respectively selected for the plurality of periods may be different from the plurality of first selected videos respectively selected for the plurality of periods, and the second video signal may have an amount of data smaller than the upper limit.

Accordingly, with the video delivery method, it is possible to deliver a video signal having a small amount of data in a case where the reception band of the terminal device is narrow.

For example, the plurality of videos may be transmitted from a plurality of cameras to the server in real time, and in a case where transmission of a video corresponding to the first selected video from a corresponding one of the cameras is discontinued, in the selecting of the first selected video, a second selected video different from the first selected video may be selected, and in the transmitting of the first video signal, a second video signal for replaying the second selected video may be transmitted to the terminal device.

Accordingly, with the video delivery method, it is possible to suppress discontinuous video delivery in a case where transmission of a video from a camera is discontinued.

For example, each of the rating values may be a rating value of each of the plurality of videos, and in the selecting of the first selected video, for each period among the plurality of periods, a video having a rating value lower than a predetermined value in the period may be selected from among the plurality of videos as the first selected video.

Accordingly, with the video delivery method, it is possible to reduce blind spots that are created in a case of use in surveillance.

For example, in the transmitting of the first video signal, the first video signal that is generated by connecting together the plurality of first selected videos respectively selected for the plurality of periods may be transmitted to the terminal device.

For example, in the transmitting of the first video signal, the plurality of videos and information for identifying the plurality of first selected videos respectively selected for the plurality of periods may be transmitted to the terminal device as the first video signal.

Further, a video reception method according to an aspect of the present disclosure is a video reception method for a terminal device that receives from a server a video signal based on a plurality of videos obtained by shooting an identical scene from a plurality of different viewpoints over a plurality of successive periods, the method including: receiving from the server the video signal for successively replaying a plurality of selected videos respectively selected for the plurality of periods from among the plurality of videos in accordance with rating values of the plurality of videos, the rating values being given by a plurality of users; and successively replaying the plurality of selected videos in accordance with the video signal.

Accordingly, with the video reception method, it is possible to replay a suitable video based on ratings given by a plurality of users.

For example, each of the rating values may be a rating value of each of the plurality of videos, and each of the selected videos may be a video that is selected from among the plurality of videos for each period among the plurality of periods and that has a highest rating value or a rating value higher than a predetermined value in the period.

Accordingly, with the video reception method, it is possible to successively replay highly rated viewpoint videos on the basis of ratings given by a plurality of users.

For example, each of the rating values may be a rating value of each of a plurality of subjects included in the plurality of videos, and each of the selected videos may be a video which is selected from among the plurality of videos for each of the plurality of periods and in which a subject having a highest rating value or having a rating value higher than a predetermined value is visible.

Accordingly, with the video reception method, it is possible to successively replay viewpoint videos in which a highly rated subject is visible on the basis of ratings given by a plurality of users.

For example, the video reception method may further include displaying any video among the plurality of videos. In the displaying of the video, a subject having a highest rating value or having a rating value higher than a predetermined value may be highlighted and displayed among a plurality of subjects included in the displayed video.

Accordingly, with the video reception method, it is possible to communicate a highly rated subject to a user.

For example, the video reception method may further include displaying any video among the plurality of videos; and displaying, in a case where any subject is selected by a user from among a plurality of subjects included in the displayed video, a menu for rating the selected subject.

Accordingly, with the video reception method, it is possible to increase the user's convenience.

For example, the video reception method may further include displaying any video among the plurality of videos; and displaying, in a case where any subject is selected by a user from among a plurality of subjects included in the displayed video, a list of videos for the plurality of periods among the plurality of videos, the videos in the list including the selected subject and having rating values higher than a predetermined value.

Accordingly, with the video reception method, it is possible to increase the user's convenience.

For example, the video reception method may further include displaying any video among the plurality of videos; and displaying, in a case where any subject is selected by a user from among a plurality of subjects included in the displayed video, a tracking video that is a video generated by connecting together the plurality of videos for tracking the selected subject.

Accordingly, with the video reception method, it is possible to increase the user's convenience.

For example, the video reception method may further include displaying an output screen that includes a first screen on which any of the plurality of videos is displayed, and a second screen which is smaller than the first screen and on which the plurality of selected videos that are replayed are displayed; and displaying, in a case where the second screen is selected by a user, the plurality of selected videos on the first screen.

Accordingly, with the video reception method, it is possible to increase the user's convenience.

For example, each of the rating values may be a rating value of each of the plurality of videos, and each of the selected videos may be a video that is selected from among the plurality of videos for each period among the plurality of periods and that has a rating value lower than a predetermined value in the period.

Further, a server according to an aspect of the present disclosure is a server for delivering to a terminal device a video signal based on a plurality of videos obtained by shooting an identical scene from a plurality of different viewpoints over a plurality of successive periods, the server including a processor, and a memory having stored therein instructions which, when executed by the processor, cause the processor to perform operations including: selecting a selected video from among the plurality of videos for each of the plurality of periods in accordance with rating values of the plurality of videos, the rating values being given by a plurality of users; and transmitting to the terminal device the video signal for successively replaying a plurality of selected videos respectively selected for the plurality of periods.

Accordingly, with the server, it is possible to deliver a suitable video based on ratings given by a plurality of users.

Further, a terminal device according to an aspect of the present disclosure is a terminal device for receiving from a server a video signal based on a plurality of videos obtained by shooting an identical scene from a plurality of different viewpoints over a plurality of successive periods, the terminal device including a processor, and a memory having stored therein instructions which, when executed by the processor, cause the processor to perform operations including: receiving from the server the video signal for successively replaying a plurality of selected videos respectively selected for the plurality of periods from among the plurality of videos in accordance with rating values of the plurality of videos, the rating values being given by a plurality of users; and successively replaying the plurality of selected videos in accordance with the video signal.

Accordingly, with the terminal device, it is possible to replay a suitable video based on ratings given by a plurality of users.

It should be noted that the general or specific aspects may be implemented as a system, a method, an integrated circuit, a computer program, a storage medium, such as a computer-readable compact disc read-only memory, or any selective combination thereof.

Hereinafter, embodiments will be specifically described with reference to the drawings. Note that any of the embodiments described below is an operative example of the present disclosure. Numerical values, forms, materials, constituent elements, arrangements and connections of constituent elements, steps, the order of steps, and so on described in the following embodiments are merely examples and are not intended to limit the present disclosure. Further, among the constituent elements described in the following embodiments, a constituent element not described in an independent claim that defines the most generic concept will be described as a preferred constituent element.

First Embodiment

In a video delivery system according to this embodiment, a plurality of selected videos are selected from among a plurality of viewpoint videos on the basis of ratings given by a plurality of users for each period, and video data obtained by connecting the selected videos together is delivered to a terminal device.

First, a configuration of a video delivery system 100 according to this embodiment is described. FIG. 1 is a block diagram illustrating an overall configuration of the video delivery system 100 according to this embodiment. The video delivery system 100 includes a plurality of cameras 101, a terminal device 102, and a server 103 that can each communicate over a network 104A or 104B.

The plurality of cameras 101 generate a plurality of viewpoint videos by shooting the same scene over the same time period from different viewpoints. The cameras 101 are carried by a plurality of users respectively. For example, the plurality of cameras 101 are owned by a plurality of spectators who are in a place, such as in a sport stadium. The plurality of viewpoint videos captured by the plurality of cameras 101 are transmitted to the server 103 over the network 104A. The cameras 101 also obtain data, such as position information, used to calculate the degree of relation among the viewpoint videos and transmit the data to the server 103. The camera 101 may be any device as long as the device has at least an image capturing function, and is a digital still camera, a digital video camera, a smartphone, or a portable terminal, for example. Examples of the plurality of cameras 101 may include not only cameras owned by spectators but also fixed cameras or cameras for broadcasting.

The networks 104A and 1048 correspond to the Internet, for example. Although the networks 104A and 1048 are separately illustrated in FIG. 1, the plurality of cameras 101, the terminal device 102, and the server 103 may be connected to one another over a single network. Alternatively, part or all of communication among the apparatuses may be directly performed without the network 104A or 104B. Further, connections among the apparatuses may be wired connections or wireless connections.

The terminal device 102 is a terminal used by a user 106 and is connected to a monitor 105 on which a video is displayed. For example, the terminal device 102 is a smartphone, a portable terminal, or a personal computer (PC). Note that the terminal device 102 may have a function similar to that of the camera 101, the user 106 may be a spectator described above, and the user 106 may view a video in a place other than a stadium described above.

The terminal device 102 receives a viewpoint video from the server 103 in accordance with an instruction provided by the user 106 and outputs the viewpoint video to the monitor 105 by using a method based on the instruction provided by the user 106. Note that the monitor 105 may be any output device, such as a PC monitor, a tablet terminal, a smartphone, a portable phone, or a monitor of a note PC. Although the terminal device 102 and the monitor 105 are separately illustrated here, the monitor 105 may be included in the terminal device 102.

An instruction from the user 106 is provided through a screen touch operation or by using a mouse or the like, for example; however, any input device may be used to provide an instruction. Instructions provided by the user 106 include instructions for selecting a viewpoint video to be viewed, making a comment on a viewpoint video, rating a viewpoint video, making a comment on a subject that is visible in a viewpoint video, rating a subject, checking information about a subject, placing an order for an item related to a subject, and the like. Some of the instructions provided by the user 106 are transmitted to the server 103.

The server 103 temporarily retains a plurality of viewpoint videos transmitted from the plurality of cameras 101. The server 103 transmits some or all of the plurality of retained viewpoint videos to the terminal device 102 in response to a request from the terminal device 102. The server 103 performs a process, such as switching between viewpoint videos, in response to a request from the terminal device 102 and transmits video data obtained in the process to the terminal device 102. The server 103 receives from the terminal device 102 ratings on viewpoint videos or subjects in viewpoint videos given by users, summarizes the ratings as comments and ratings on the viewpoint videos or the subjects, and retains the ratings and comments in a database.

The server 103 transmits information to the terminal device 102 in response to a request from the terminal device 102 for presenting information about a viewpoint video or a subject. The server 103 identifies a subject included in a plurality of viewpoint videos captured by the cameras 101 by using information about the subject specified by the user 106, the information being transmitted from the terminal device 102. Specifically, the server 103 receives subject information (name, uniform number, or the like) about a subject specified by the user 106 or pixel information about a subject in a viewpoint video specified by the user 106 through a touch operation, a mouse operation, a gesture operation, a line-of-sight operation, or a voice operation and identifies the subject by performing image processing, such as feature value matching of the plurality of viewpoint videos captured by the cameras 101 with the pixel information that has been received. Note that the server 103 may create a combined image by combining the plurality of viewpoint videos captured by the plurality of cameras 101. This combined image may be included in a plurality of viewpoint videos that are transmitted to the terminal device 102.

Note that a plurality of viewpoint videos may be transmitted from the plurality of cameras 101 in real time, and the user 106 may view the viewpoint videos in real time by using the terminal device 102. Alternatively, at least one of transmission and viewing of videos need not be performed in real time. That is, the user 106 may view a viewpoint video captured in the past at any time. Transmission and reception of video signals (videos) mainly means streaming transmission and reception in which video signals are successively transmitted or received.

Figure 2:
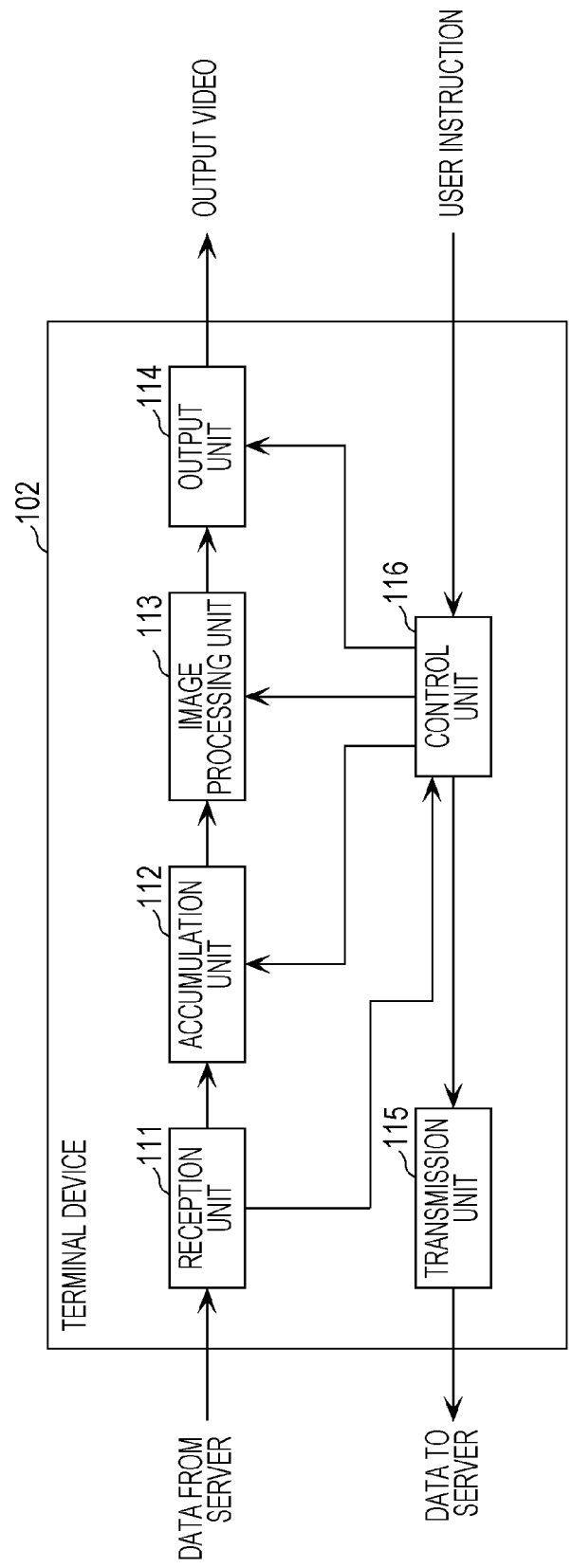
FIG. 2 is a block diagram of a terminal device according to the first embodiment.

Hereinafter, a configuration of each apparatus is described. FIG. 2 is a block diagram illustrating a configuration of the terminal device 102. The terminal device 102 includes a reception unit 111, an accumulation unit 112, an image processing unit 113, an output unit 114, a transmission unit 115, and a control unit 116.

The reception unit 111 receives video data transmitted from the server 103. Specifically, the video data includes a viewpoint video specified by the user 106. The video data also includes a video that is closely related to the viewpoint video as sub-data. For example, the video is another viewpoint video captured at a position closer to that of a viewpoint video that is being viewed, another viewpoint video including a subject which is visible in a viewpoint video that is being viewed, or the like. In this way, the server 103 may simultaneously transmit to the terminal device 102 a video that is closely related to a viewpoint video that is being viewed together with the video that is being viewed. The video data includes not only a viewpoint video specified by the user 106 but also comments or ratings on the viewpoint video or a subject, related information, and the like. The server 103 transmits information and the like about a viewpoint video that is determined to be most commonly viewed as a result of summarization by the server 103.

The accumulation unit 112 temporarily retains the video data received by the reception unit 111, which enables seamless display upon switching between viewpoints.

The image processing unit 113 performs a decoding process in a case where a viewpoint video has been coded. The image processing unit 113 generates an output video to be presented to the user 106 by using a viewpoint video, information about the viewpoint video, and information about a subject, the information being received from the server 103. In this case, the image processing unit 113 may separately obtain from the server 103 statistical information about viewpoint videos that are commonly viewed and about subjects on which a large number of comments are made or which are highly rated and the like and create an output video in which the information about the viewpoints and subjects are highlighted. For example, the image processing unit 113 may illuminate an icon for selecting a viewpoint video that is commonly viewed or illuminate the outline or the like of a subject that is highly rated to thereby highlight the viewpoint video or the subject.

The output unit 114 outputs the output video generated by the image processing unit 113 to the monitor 105.

The control unit 116 accepts a user instruction. Here, a user instruction includes (1) a viewpoint video switching request, (2) a rating giving request, and (3) an information obtaining request.

The viewpoint video switching request (1) is a request for switching between viewpoint videos for viewing and has (1-1) a favorite viewpoint video switching mode, (1-2) a favorite subject switching mode, (1-3) a recommended viewpoint video switching mode, and (1-4) a recommended subject switching mode.

The favorite viewpoint video switching mode (1-1) is a mode for selecting a favorite viewpoint video registered in advance by the user 106. The favorite subject switching mode (1-2) is a mode for selecting a viewpoint video that includes a favorite subject registered in advance by the user 106. In the favorite viewpoint video switching mode and in the favorite subject switching mode, the user 106 can select a viewpoint video or a subject at any time while viewing a video as well as a favorite viewpoint video or a viewpoint video including a favorite subject registered in advance by the user 106.

The recommended viewpoint video switching mode (1-3) is a mode for selecting a viewpoint video highly rated by a plurality of users. The recommended subject switching mode (1-4) is a mode for selecting a viewpoint video that includes a subject highly rated by a plurality of users.

The rating giving request (2) is a request for rating a viewpoint video or a subject and has (2-1) a viewpoint video rating giving mode and (2-2) a subject rating giving mode. The viewpoint video rating giving mode (2-1) is a mode for the user 106 to rate a viewpoint video. The subject rating giving mode (2-2) is a mode for the user 106 to rate a subject included in a viewpoint video.

The information obtaining request (3) is a request for obtaining information about a viewpoint video or a subject and has (3-1) a viewpoint video information obtaining mode and (3-2) a subject information obtaining mode. The viewpoint video information obtaining mode (3-1) is a mode for obtaining information about a viewpoint video. The subject information obtaining mode (3-2) is a mode for obtaining information about a subject included in a viewpoint video.

In a case where a user instruction is the viewpoint video switching request (1), the control unit 116 transmits information about a specified viewpoint video position or information about a specified subject position to the server 103 via the transmission unit 115.

In a case where a user instruction is the rating giving request (2), the control unit 116 transmits information about a comment or a rating on a viewpoint video and time information about the time when the rating was given, information about a comment or a rating on a specified subject and time information about the time when the rating was given, or the like to the server 103 via the transmission unit 115.

In a case where a user instruction is the information obtaining request (3), the control unit 116 transmits information about a specified viewpoint video position or information about a specified subject position, information about information content to be obtained, and the like to the server 103 via the transmission unit 115. Here, information content to be obtained is information about a viewpoint video or a subject, and examples thereof include (1) comments or ratings on the viewpoint video or the subject, (2) a profile of the videographer of the viewpoint video or that of the subject, and (3) information about other content created by the videographer of the viewpoint video or information about items related to the subject.

In a case where a subject is specified, that is, in a case where a user instruction is a request having the favorite subject switching mode (1-2), the subject rating giving mode (2-2) or the subject information obtaining mode (3-2), subject information (name, uniform number, or the like) about the subject specified by the user 106 or pixel information about the subject in a viewpoint video specified by the user 106 through a touch operation, a mouse operation, a gesture operation, a line-of-sight operation, or a voice operation is transmitted to the server 103 in order for the server 103 to identify the subject specified by the user 106.

Figure 3:
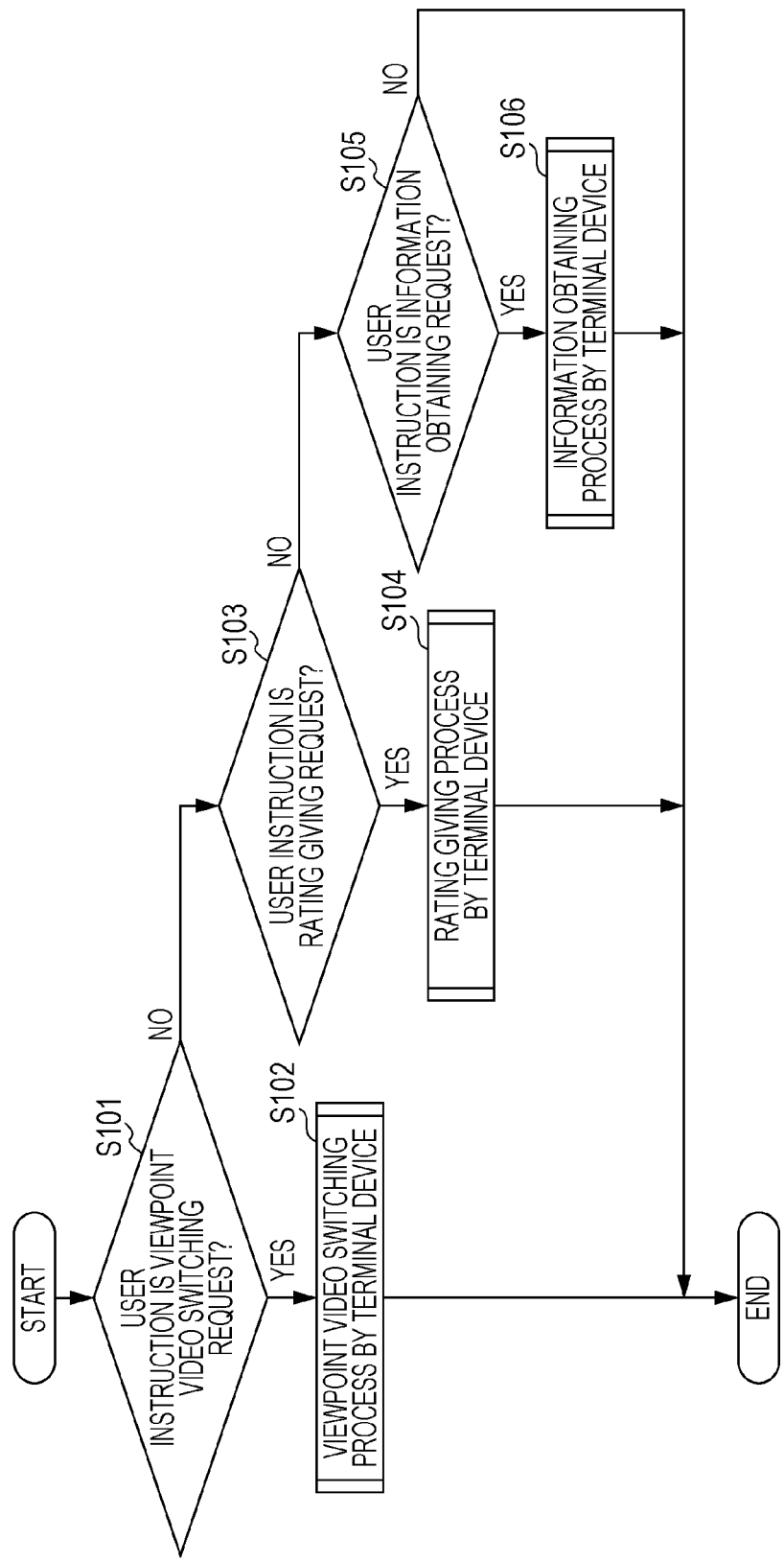
FIG. 3 is a flowchart illustrating a process performed by the terminal device according to the first embodiment.

Hereinafter, an operation of the terminal device 102 is described. FIG. 3 is a flowchart of the entire process performed by the terminal device 102.

First, the terminal device 102 determines whether a user instruction is the viewpoint video switching request (1), the rating giving request (2), or the information obtaining request (3) (steps S101, S103, and S105).

If the user instruction is the viewpoint video switching request (Yes in step S101), the terminal device 102 performs a viewpoint video switching process (step S102). If the user instruction is the rating giving request (Yes in step S103), the terminal device 102 performs a rating giving process (step S104). If the user instruction is the information obtaining request (Yes in step S105), the terminal device 102 performs an information obtaining process (step S106).

Note that the terminal device 102 need not perform all of the steps for determination described above. The terminal device 102 may only determine whether the user instruction is the viewpoint video switching request, for example, that is, may optionally perform the steps for determination.

Hereinafter, the viewpoint video switching process (step S102), the rating giving process (step S104), and the information obtaining process (step S106) are described in detail.

Figure 4:
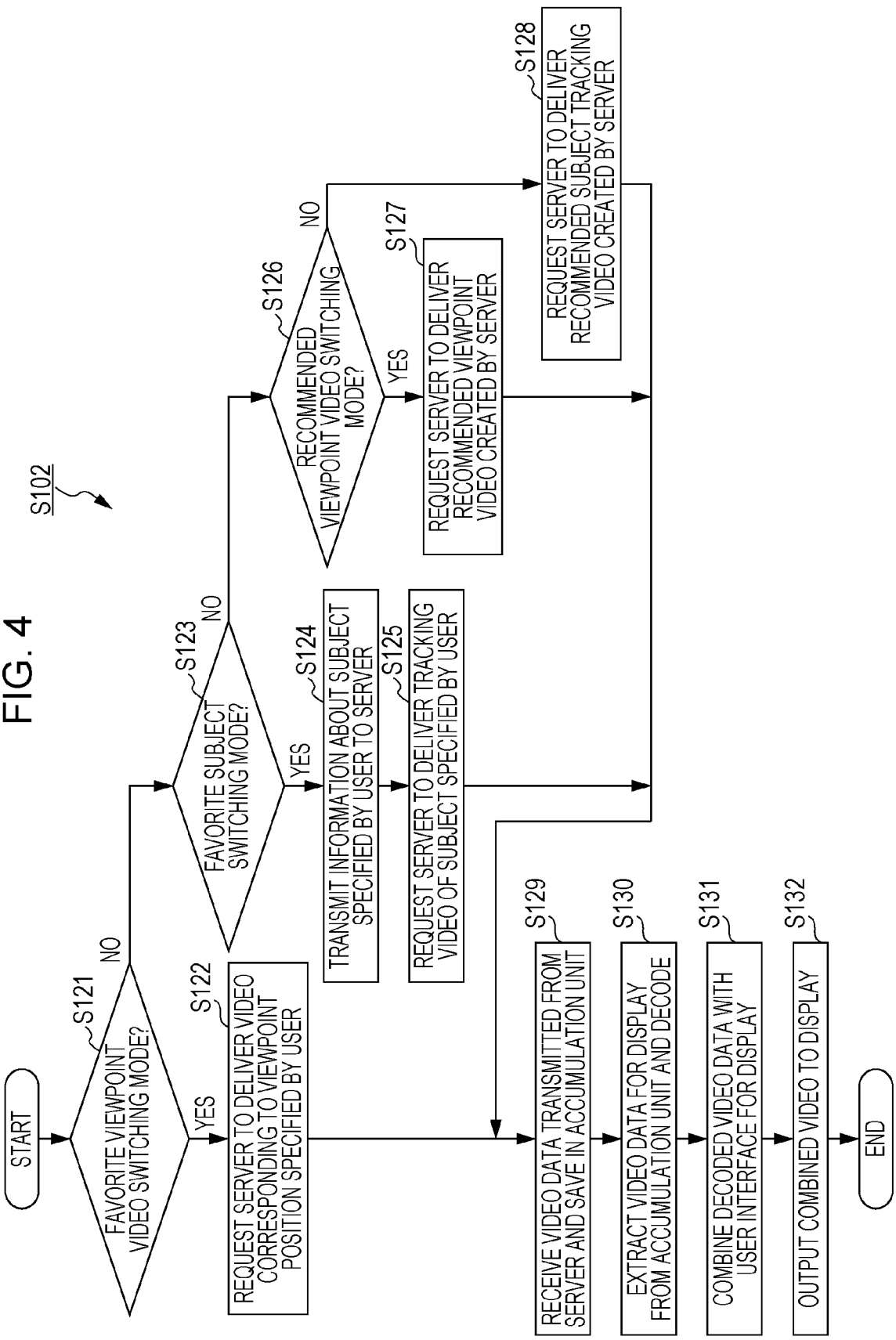
FIG. 4 is a flowchart illustrating a viewpoint video switching process performed by the terminal device according to the first embodiment.

First, the viewpoint video switching process (step S102) is described. FIG. 4 is a flowchart of the viewpoint video switching process performed by the terminal device 102.

First, the terminal device 102 determines whether the viewpoint video switching mode is the favorite viewpoint video switching mode (1-1), the favorite subject switching mode (1-2), the recommended viewpoint video switching mode (1-3), or the recommended subject switching mode (1-4) (steps S121, S123, and S126).

If the viewpoint video switching mode is the favorite viewpoint video switching mode (Yes in step S121), the terminal device 102 requests the server 103 to deliver a viewpoint video corresponding to a viewpoint video position specified by the user 106 (step S122).

If the viewpoint video switching mode is the favorite subject switching mode (Yes in step S123), the terminal device 102 transmits information about a subject specified by the user 106 to the server 103 (step S124). Here, information about a subject is subject information, such as the name, the uniform number, or the like of the subject, or pixel information about the subject in a viewpoint video specified by the user 106 through a touch operation or a mouse operation. Subject information (name, uniform number, or the like) is obtained when the user 106 specifies the subject information output to a screen through a touch operation or a mouse operation, for example. Pixel information about a subject in a viewpoint video includes the positions of pixels of the subject in the viewpoint video or information about the pixels, for example.

The terminal device 102 requests the server 103 to deliver a tracking video of the subject specified by the user 106 (step S125).

If the viewpoint video switching mode is the recommended viewpoint video switching mode (Yes in step S126), the terminal device 102 requests the server 103 to deliver a recommended viewpoint video generated by the server 103 (step S127).

If the viewpoint video switching mode is the recommended subject switching mode (No in step S126), the terminal device 102 requests the server 103 to deliver a recommended subject tracking video generated by the server 103 (step S128).

After step S122, S125, S127 or S128, the terminal device 102 receives video data transmitted from the server 103 and saves the received video data in the accumulation unit 112 (step S129). Note that the video data received from the server 103 may include a video created by the server 103 performing processing, editing, or the like in addition to a viewpoint video.

The terminal device 102 need not wait for reception of the entire video data that is received from the server 103 to be completed and may start replaying the video at the time of reception of a certain amount of data. The terminal device 102 may replay a previously replayed video until video data is received from the server 103 and replay of the video can be started.

Next, the terminal device 102 extracts video data for display from the accumulation unit 112 and decodes the video data (step S130). Then, the terminal device 102 generates a combined video (output video) by combining the decoded video data with a user interface for display (step S131).

Next, the terminal device 102 outputs the combined video to the monitor 105, such as a display (step S132). As a result, the combined video is displayed on the monitor 105.

Figure 5:
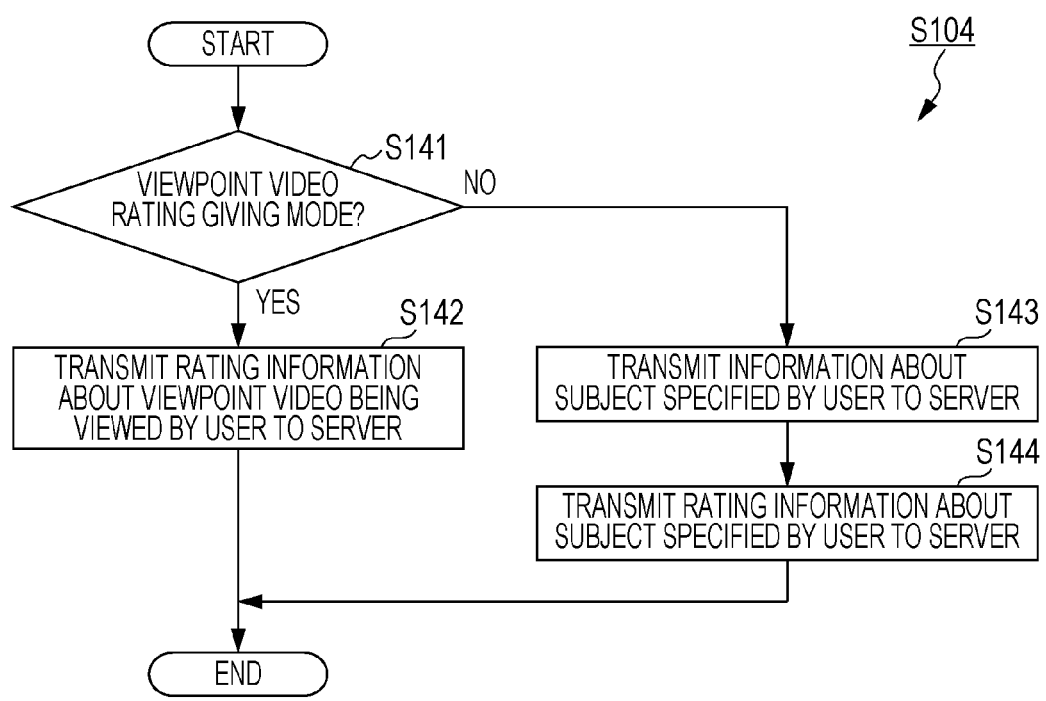
FIG. 5 is a flowchart illustrating a rating giving process performed by the terminal device according to the first embodiment.

Hereinafter, the rating giving process (step S104) is described. FIG. 5 is a flowchart of the rating giving process performed by the terminal device 102.

First, the terminal device 102 determines whether the rating giving mode is the viewpoint video rating giving mode (2-1) or the subject rating giving mode (2-2) (step S141).

If the rating giving mode is the viewpoint video rating giving mode (Yes in step S141), the terminal device 102 transmits rating information about a viewpoint video that is being viewed by the user 106 and time information about the time when the rating was given to the server 103 (step S142). Here, rating information includes a comment or a rating on a viewpoint video. A rating may be information indicating whether the viewpoint video is good or poor or information indicating to what degree the viewpoint video is good or poor.

If the rating giving mode is the subject rating giving mode (No in step S141), the terminal device 102 transmits information about a subject specified by the user 106 to the server 103 (step S143). Note that the content of information about a subject and the method for obtaining the information are similar to those in step S124 described above.

Subject information (name, uniform number, or the like) is obtained when the user 106 specifies the subject information output to a screen through a touch operation or a mouse operation, by voice, or the like, for example. Pixel information about a subject in a viewpoint video includes the positions of pixels of the subject in the viewpoint video or information about the pixels.

Next, the terminal device 102 transmits rating information about the subject specified by the user 106 and time information about the time when the rating was given to the server 103 (step S144).

Figure 6:
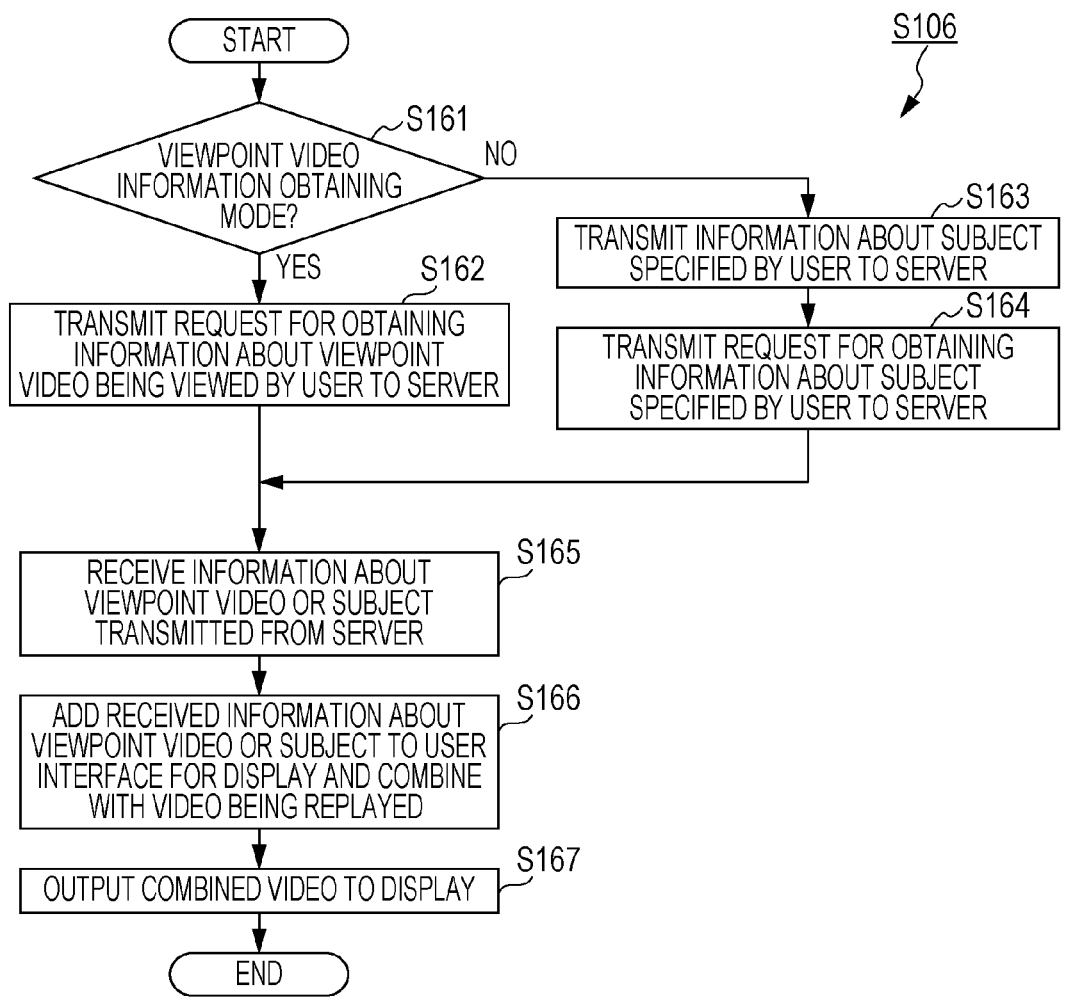
FIG. 6 is a flowchart illustrating an information obtaining process performed by the terminal device according to the first embodiment.

Hereinafter, the information obtaining process (step S106) is described. FIG. 6 is a flowchart of the information obtaining process performed by the terminal device 102.

First, the terminal device 102 determines whether the information obtaining mode is the viewpoint video information obtaining mode (3-1) or the subject information obtaining mode (3-2) (step S161).

If the information obtaining mode is the viewpoint video information obtaining mode (Yes in step S161), the terminal device 102 transmits an obtaining request for obtaining information about a viewpoint video that is being viewed by the user 106 to the server 103 (step S162). Here, information about a viewpoint video includes comments or ratings on the viewpoint video, a profile of the videographer of the viewpoint video, information about other content created by the videographer of the viewpoint video, and the like, for example.

If the information obtaining mode is the subject information obtaining mode (No in step S161), the terminal device 102 transmits information about a subject specified by the user 106 to the server 103 (step S163). Note that the content of information about a subject and the method for obtaining the information are similar to those in step S124 described above.

Next, the terminal device 102 transmits an obtaining request for obtaining information about the subject specified by the user 106 to the server 103 (step S164). Here, information about a subject includes comments or ratings on the subject, a profile of the subject, information about items related to the subject, and the like, for example.

After step S162 or S164, the terminal device 102 receives information about the viewpoint video or the subject transmitted from the server 103 (step S165). Next, the terminal device 102 adds the received information about the viewpoint video or the subject to the user interface for display and combines the interface with the video that is being replayed to thereby generate a combined video (step S166). Note that the terminal device 102 may display the received information about the viewpoint video or the subject by superimposing the information on the video that is being replayed.

Next, the terminal device 102 outputs the generated combined video to the monitor 105 (step S167). As a result, the combined video is displayed on the monitor 105.

Figure 7:
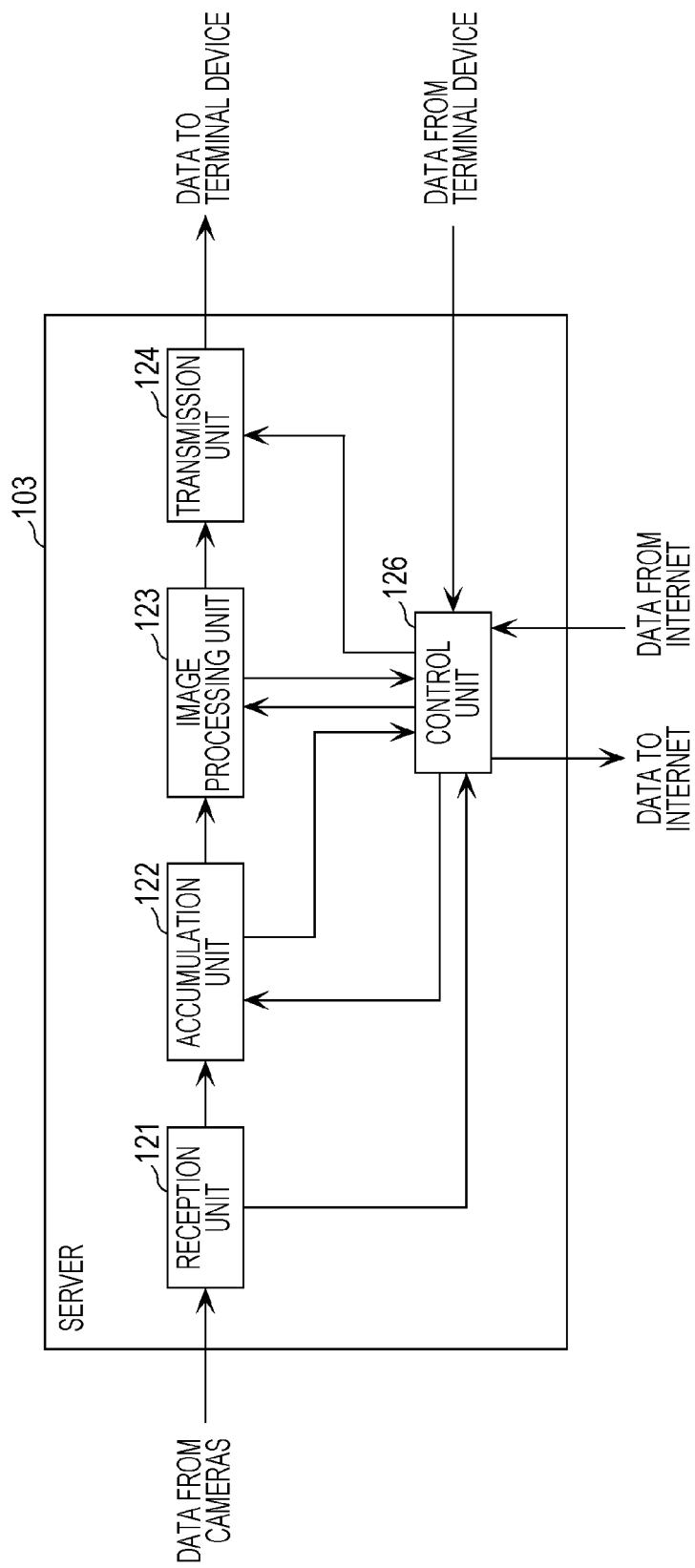
FIG. 7 is a block diagram of a server according to the first embodiment.

Hereinafter, a configuration of the server 103 is described. FIG. 7 is a block diagram illustrating a configuration of the server 103. The server 103 illustrated in FIG. 7 includes a reception unit 121, an accumulation unit 122, an image processing unit 123, a transmission unit 124, and a control unit 126.

The reception unit 121 receives from the plurality of cameras 101 a plurality of viewpoint videos obtained by the plurality of cameras 101 shooting the same scene over the same time period from different viewpoints and image capturing camera information. Image capturing camera information includes position information about the cameras 101, image capture time information, profile information about the videographers, and the like, for example. Here, position information about an image capturing camera is information obtained by using a global positioning system (GPS) sensor or the like built in the image capturing camera, for example. Note that the position information about an image capturing camera may be position information estimated from radio information about WiFi (registered trademark) communication or the like or from feature values of the captured video. The server 103 may estimate the position of the camera 101 from radio information about WiFi communication or the like or from feature values of the captured video.

The accumulation unit 122 stores the plurality of viewpoint videos and the image capturing camera information received by the reception unit 121. The accumulation unit 122 stores comments or ratings on viewpoint videos or subjects given by users together with time information about the times when these comments or ratings were given. The accumulation unit 122 stores collection data, such as statistics or the like about viewpoint videos or subjects on which a large number of comments have been made or which have been highly rated. The accumulation unit 122 may store information about viewpoint videos or subjects, such as profiles of the videographers of the viewpoint videos or profiles of the subjects or information about items related to the subjects.

The image processing unit 123 generates video data by processing or editing viewpoint videos in response to the viewpoint video switching request from the terminal device 102 and transmits the generated video data to the terminal device 102 via the transmission unit 124. The image processing unit 123 identifies a viewpoint video that includes a subject indicated by pixel information by performing feature value matching of the pixel information about the subject in a viewpoint video, the pixel information being received from the terminal device 102, with a plurality of viewpoint videos captured by the cameras 101, and transmits the result of identification to the control unit 126.

The transmission unit 124 transmits the video data generated by the image processing unit 123.

The control unit 126 receives data from the terminal device 102 and from the Internet (network 104A or 104B). Specifically, the control unit 126 receives the viewpoint video switching request, the rating giving request, and the information obtaining request from the terminal device 102. The control unit 126 creates a search key for a subject, obtains a profile of the subject, information about related items, and the like by searching the Internet, and stores the profile or information in the accumulation unit 122 or transmits the profile or information to the terminal device 102. Further, the control unit 126 transmits/receives data to/from a Web store for purchasing related items.

Figure 8:
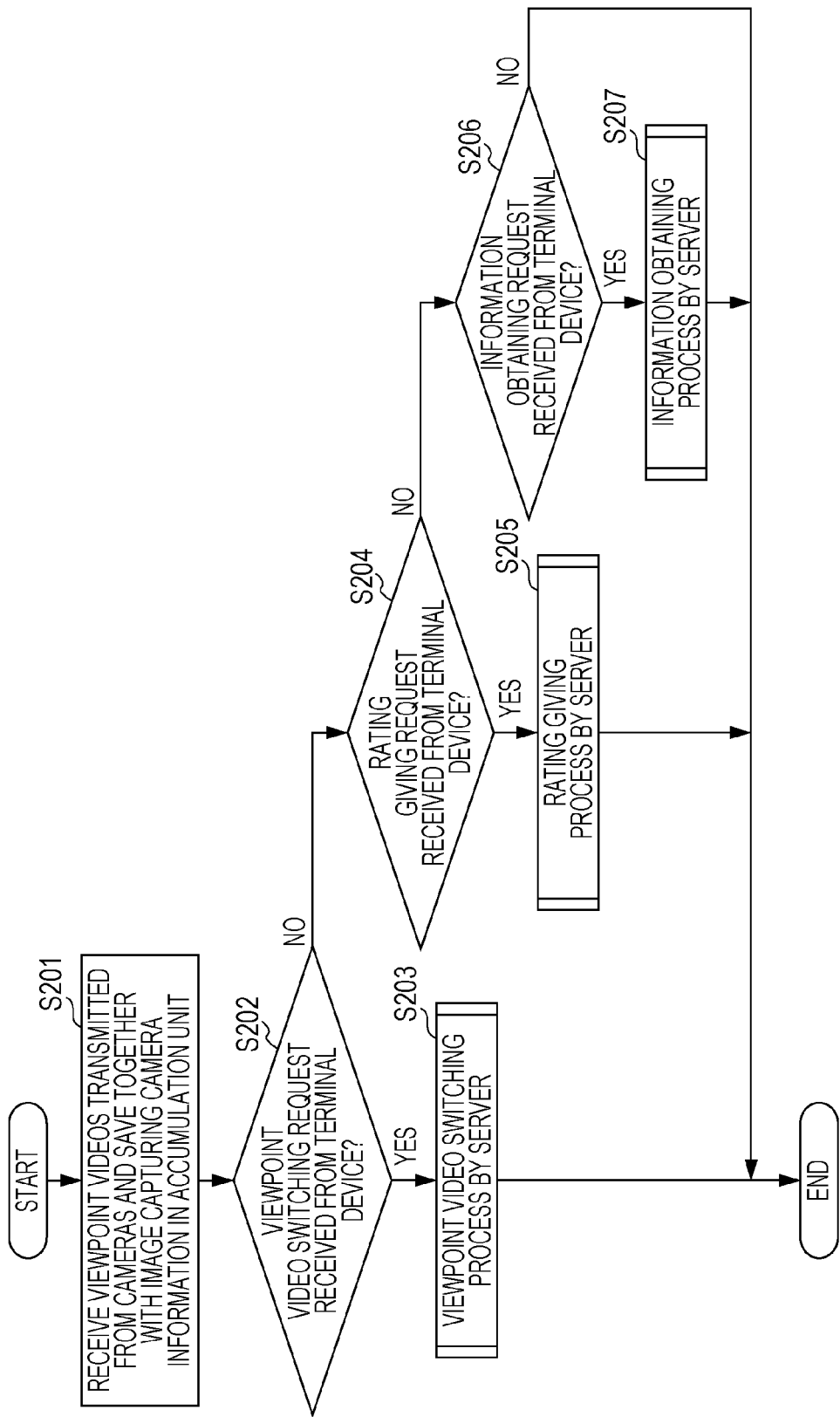
FIG. 8 is a flowchart illustrating a process performed by the server according to the first embodiment.

Hereinafter, an operation of the server 103 is described. FIG. 8 is a flowchart of the entire process performed by the server 103.

First, the server 103 receives a plurality of viewpoint videos transmitted from the plurality of cameras 101 and saves the viewpoint videos together with image capturing camera information in the accumulation unit 122 (step S201).

Next, the server 103 determines whether the viewpoint video switching request has been received from the terminal device 102 (step S202). If the viewpoint video switching request has been received (Yes in step S202), the server 103 performs a viewpoint video switching process (step S203).

The server 103 determines whether the rating giving request has been received from the terminal device 102 (step S204). If the rating giving request has been received (Yes in step S204), the server 103 performs a rating giving process (step S205).

The server 103 further determines whether the information obtaining request has been received from the terminal device 102 (step S206). If the information obtaining request has been received (Yes in step S206), the server 103 performs an information obtaining process (step S207).

Note that the order of steps illustrated in FIG. 8 is an example, and the determination steps in steps S202, S204, and S206 may be performed in any order.

Rating information about a rating given to a viewpoint video or a subject need not be limited to information obtained directly from the user 106 and may be obtained separately. For example, rating information may be separately obtained via a social networking service (SNS) or the like.

Hereinafter, the viewpoint video switching process (step S203), the rating giving process (step S205), and the information obtaining process (step S207) are described in detail.

Figure 9:
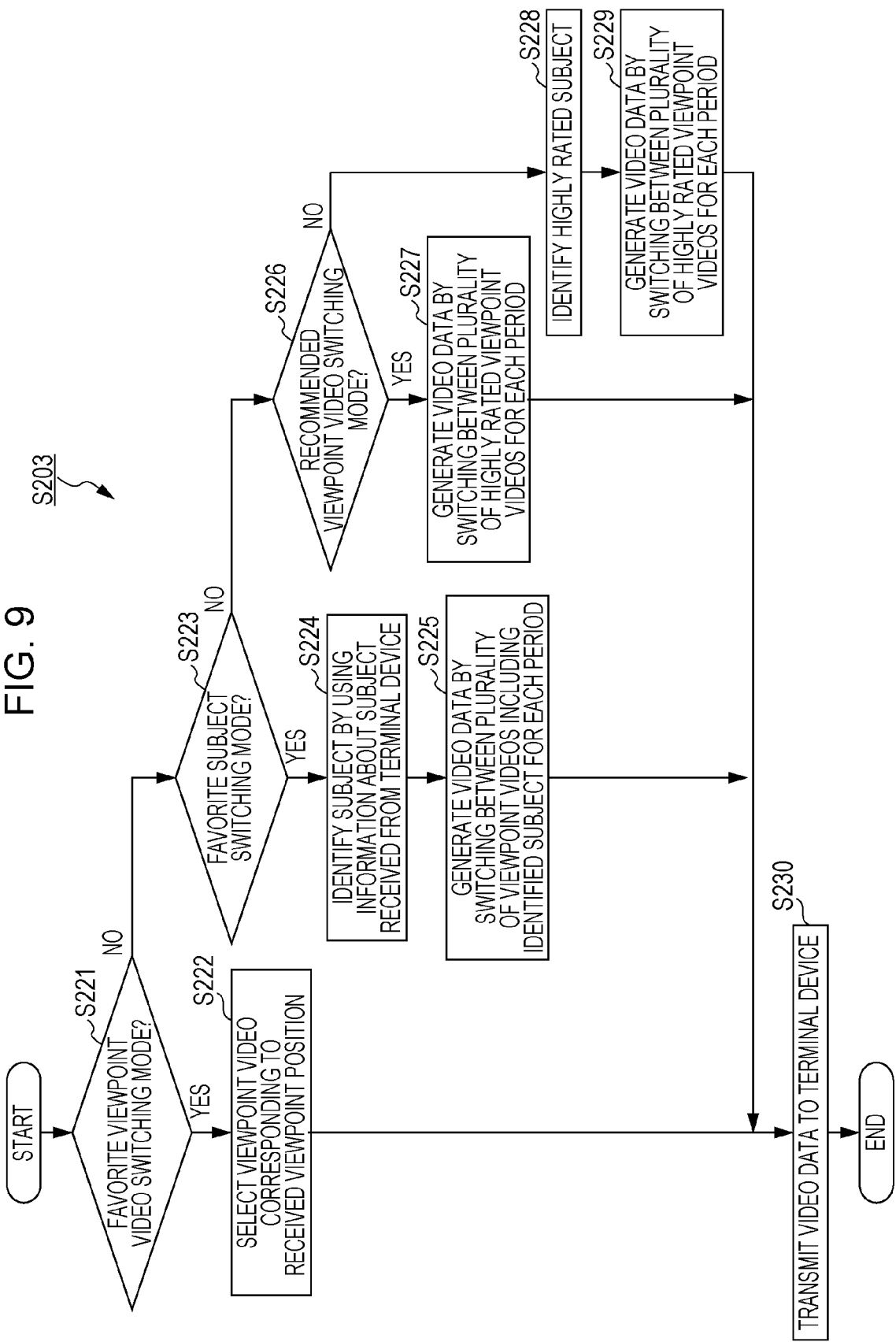
FIG. 9 is a flowchart illustrating a viewpoint video switching process performed by the server according to the first embodiment.

First, the viewpoint video switching process (step S203) is described. FIG. 9 is a flowchart of the viewpoint video switching process performed by the server 103.

First, the server 103 determines whether the viewpoint video switching mode is the favorite viewpoint video switching mode (1-1), the favorite subject switching mode (1-2), the recommended viewpoint video switching mode (1-3), or the recommended subject switching mode (1-4) (steps S221, S223, and S226).

If the viewpoint video switching mode is the favorite viewpoint video switching mode (Yes in step S221), the server 103 selects a viewpoint video corresponding to a viewpoint video position that has been received from among viewpoint videos stored in the accumulation unit 122 and sets the viewpoint video as video data to be transmitted to the terminal device 102 (step S222).

If the viewpoint video switching mode is the favorite subject switching mode (Yes in step S223), the server 103 identifies a subject that has been specified by the user 106 by using information about the subject received from the terminal device 102 (step S224). Specifically, the server 103 uses subject information (name, uniform number, or the like), or pixel information about the subject in a viewpoint video and a plurality of viewpoint videos from a group of image capturing cameras, and identifies the subject by performing feature value matching or the like.

Next, the server 103 selects a plurality of viewpoint videos that include the identified subject from among the viewpoint videos stored in the accumulation unit 122 and switches between the selected viewpoint videos for each period in accordance with the proportion of the area of the subject in each video to thereby generate video data to be transmitted to the terminal device 102 (step S225). Note that the server 103 may preferentially select a viewpoint video in which the full face of the subject is always visible or may preferentially select a viewpoint video in which the subject is always visible at the center, for example, instead of selecting a viewpoint video in accordance with the proportion of the area of the subject in each video. That is, the server 103 may select a video that provides a good view of the subject in accordance with the image capture condition.

If the viewpoint video switching mode is the recommended viewpoint video switching mode (Yes in step S226), the server 103 automatically switches between viewpoint videos for each period in accordance with statistical data about highly rated viewpoint videos to thereby generate video data to be transmitted to the terminal device 102 (step S227).

Here, a highly rated viewpoint video is a viewpoint video that receives high ratings from users. For example, a menu for giving a high rating is provided for each viewpoint video, and the number of high ratings on the viewpoint video is incremented by one when a user selects the menu. A highly rated viewpoint video is a viewpoint video that has the largest number of high ratings or that has a number of high ratings larger than a predetermined value. Further, a menu for giving a low rating may be provided. In this case, the rating of a viewpoint video may be determined on the basis of the difference between the number of high ratings and the number of low ratings or the like.

A rating using numerical values on a scale from 1 to 5 where 5 indicates best and 1 indicates poorest, for example, may be given by a user. In this case, the rating of a viewpoint video may be determined on the basis of the average of the rating values.

Determination described above may take into consideration the number of ratings given (both the number of high ratings and the number of low ratings). Alternatively, a viewpoint video that is replayed (viewed) a larger number of times may be determined to be highly rated, or a viewpoint video that is replayed (viewed) for a longer time may be determined to be highly rated.

A menu for a user to make a comment on a viewpoint video may be provided, and a viewpoint video that receives a larger number of comments from users may be determined to be highly rated. Further, the content of comments may be analyzed, and a high or low rating, or a numerical value on a scale may be determined on the basis of the content of the comments.

Alternatively, a viewpoint video that is registered as a favorite by a larger number of users may be determined to be highly rated.

Two or more methods among the methods for determination described above may be combined.

The statistical data may be statistical data about the entire scene that is shot or may be statistical data about a divided scene that corresponds to each period. For example, in a case of a sports game, the statistical data may be statistical data for the entire period of the game, or may be statistical data for the first half and the second half or for each predetermined period. Alternatively, the statistical data may be statistical data for a long period that extends beyond the period of the scene that is shot. For example, in the case of a sports game, the statistical data may be statistical data about all of a plurality of games played in one week or in one month or may be statistical data for one season or for a plurality of seasons.

If the viewpoint video switching mode is the recommended subject switching mode (No in step S226), the server 103 identifies a subject by using statistical data about highly rated subjects (step S228). Note that a highly rated subject is determined in a manner similar to that for a highly rated viewpoint video described above.

Next, the server 103 selects a plurality of viewpoint videos that include the identified subject from among the viewpoint videos stored in the accumulation unit 122 and switches between the selected viewpoint videos for each period in accordance with the proportion of the area of the subject in each video to thereby generate video data to be transmitted to the terminal device 102 (step S229). Note that the server 103 may preferentially select a viewpoint video in which the full face of the subject is always visible or may preferentially select a viewpoint video in which the subject is always visible at the center instead of selecting a viewpoint video on the basis of the proportion of the area of the subject in each video. That is, the server 103 may select a video that provides a good view of the subject in accordance with the image capture condition.

After step S222, S225, S227, or S229, the server 103 transmits the generated video data to the terminal device 102 (step S230).

Note that in a case where a specific event occurs, such as in a case where a moving subject becomes non-visible in a viewpoint video in the favorite viewpoint video switching mode or in the favorite subject switching mode or in a case where image capture is discontinued because the battery of the camera that is capturing a viewpoint video runs out, the server 103 may detect the event and automatically switch to another viewpoint video for viewing that is captured at a position closer to that of the viewpoint video that the user 106 has been viewing. The server 103 may switch the switching mode to the recommended viewpoint video switching mode or the recommended subject switching mode. On the other hand, the server 103 may switch the switching mode to the favorite viewpoint video switching mode or the favorite subject switching mode in a case where a specific event occurs in the recommended viewpoint video switching mode or the recommended subject switching mode.

Comments and rating values on a subject need not be limited to those given by users, and the server 103 may separately obtain comments and rating values. For example, the server 103 may set in advance an initial value on the basis of the number of search results obtained through a Web search using the name of the subject.

Figure 10:
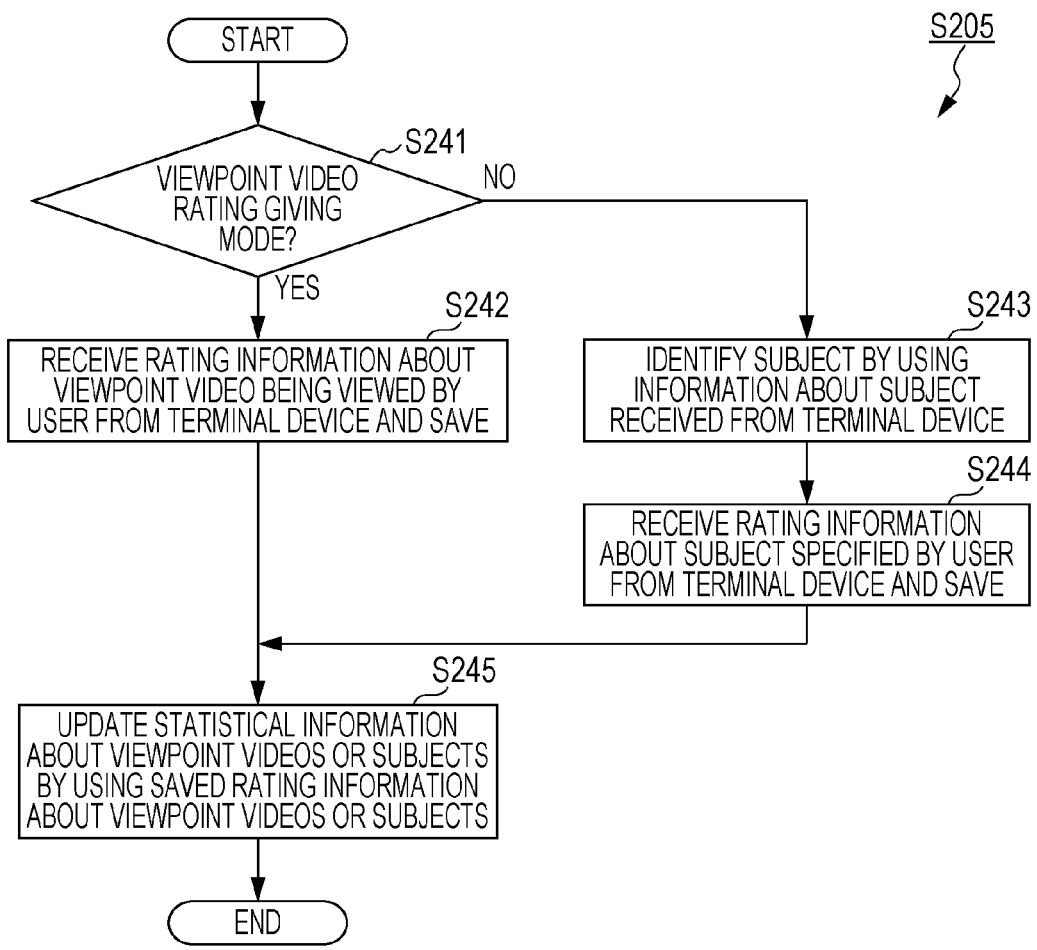
FIG. 10 is a flowchart illustrating a rating giving process performed by the server according to the first embodiment.

Hereinafter, the rating giving process (step S205) is described. FIG. 10 is a flowchart of the rating giving process performed by the server 103.

First, the server 103 determines whether the rating giving mode is the viewpoint video rating giving mode (2-1) or the subject rating giving mode (2-2) (step S241).

If the rating giving mode is the viewpoint video rating giving mode (Yes in steep S241), the server 103 receives rating information that is a comment or a rating on a viewpoint video that is being viewed by the user 106 and time information about the time when the rating was given from the terminal device 102 and saves the received rating information about the viewpoint video in the accumulation unit 122 (step S242).

If the rating giving mode is the subject rating giving mode (No in steep S241), the server 103 identifies a subject by using information about the subject received from the terminal device 102 (step S243). Note that the content of information about a subject and the method for identifying the subject are similar to those in step S224 described above.

Next, the server 103 receives rating information about the subject specified by the user 106 and time information about the time when the rating was given from the terminal device 102 and saves the received rating information about the subject in the accumulation unit 122 (step S244).

After step S242 or S244, the server 103 periodically updates statistical information about highly rated viewpoint videos or subjects by using rating information about viewpoint videos or subjects and time information about the times when ratings were given, the rating information and time information having been saved in the accumulation unit 122, and saves the updated statistical information in the accumulation unit 122 (step S245).

Figure 11:
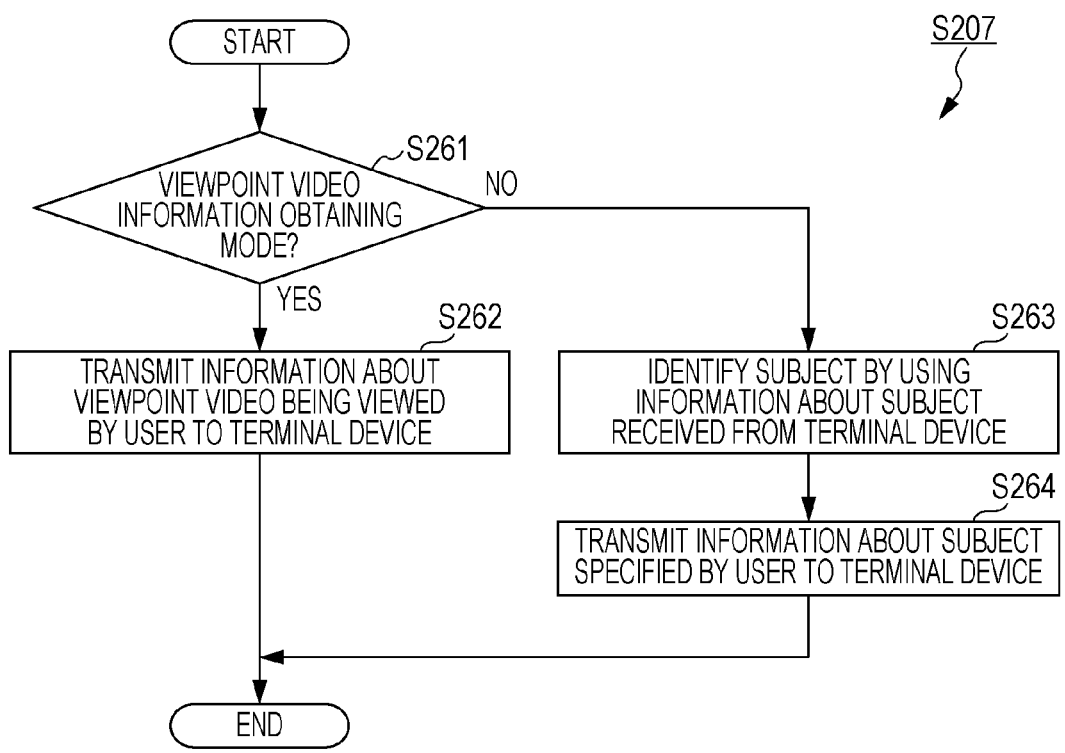
FIG. 11 is a flowchart illustrating an information obtaining process performed by the server according to the first embodiment.

Hereinafter, the information obtaining process (step S207) is described. FIG. 11 is a flowchart of the information obtaining process performed by the server 103.

First, the server 103 determines whether the information obtaining mode is the viewpoint video information obtaining mode (3-1) or the subject information obtaining mode (3-2) (step S261).

If the information obtaining mode is the viewpoint video information obtaining mode (Yes in step S261), the server 103 reads information about a viewpoint video that is being viewed by the user 106 from the accumulation unit 122 and transmits the read information to the terminal device 102 (step S262). Here, information about a viewpoint video includes comments or ratings on the viewpoint video, a profile of the videographer of the viewpoint video, information about other content created by the videographer of the viewpoint video, and the like, for example.

If the information obtaining mode is the subject information obtaining mode (No in step S261), the server 103 identifies a subject specified by the user 106 by using information about the subject received from the terminal device 102 (step S263). Note that the content of information about a subject and the method for obtaining the information are similar to those in step S224 described above. Alternatively, the server 103 may select several subjects by performing feature value matching or the like and make the user 106 select a target subject from among the several subjects.

Next, the server 103 reads information about the subject specified by the user 106 from the accumulation unit 122 and transmits the read information to the terminal device 102 (step S264). Here, information about a subject includes comments or ratings on the subject, a profile of the subject, information about items related to the subject, and the like, for example.

Figure 12:
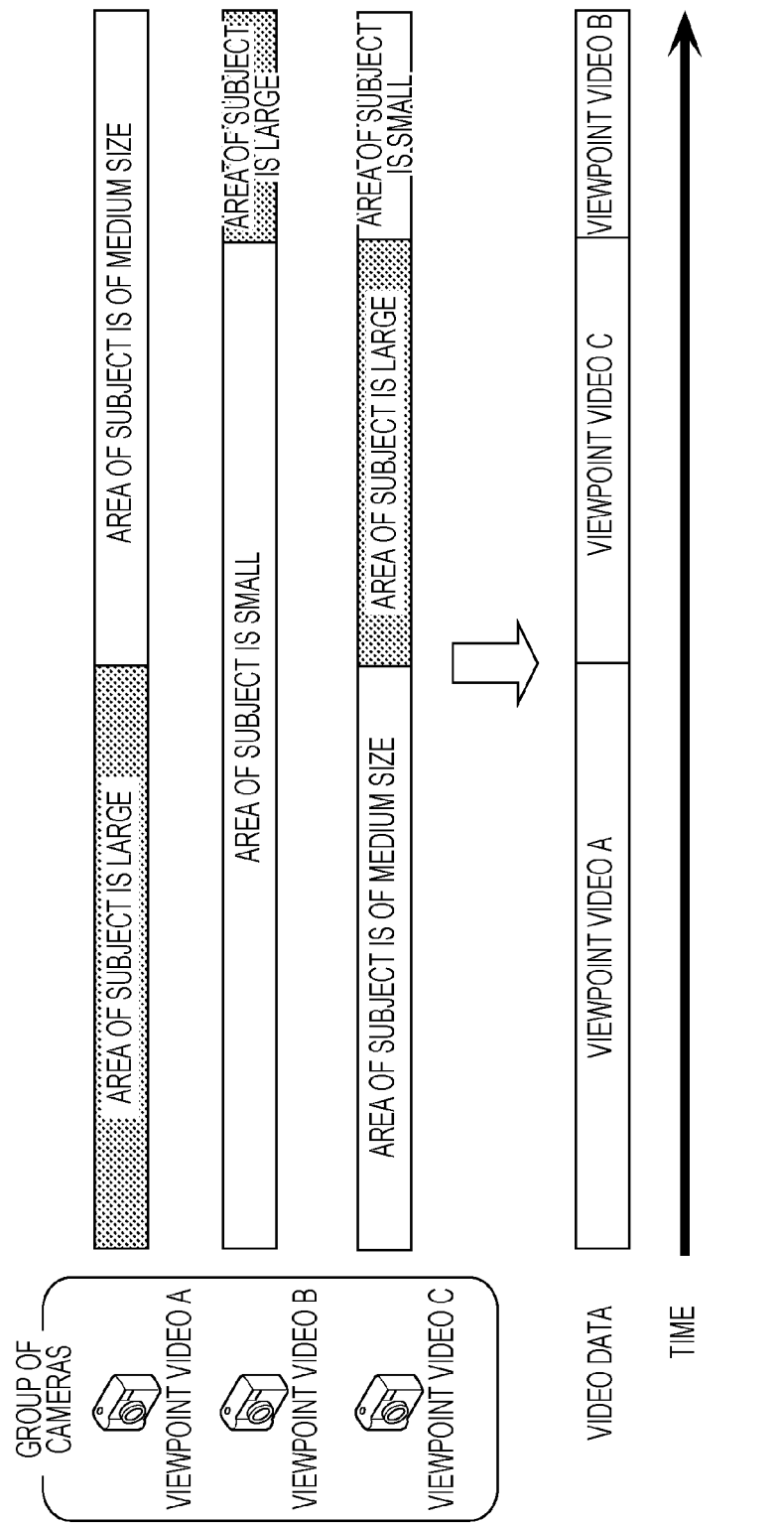
FIG. 12 is a diagram illustrating an example of an operation in a favorite subject switching mode according to the first embodiment.

Hereinafter, an example of an operation of the viewpoint video switching process is described. FIG. 12 is a diagram illustrating an example of an operation in the favorite subject switching mode.

In the example, the server 103 selects a viewpoint video A, a viewpoint video B, and a viewpoint video C that include a specified subject from viewpoint videos stored in the accumulation unit 122 and switches between the selected viewpoint videos for each period in accordance with the proportion of the area of the subject in each video to thereby generate video data to be transmitted to the terminal device 102. In the first period, the proportion of the area of the subject specified by the user 106 is larger in the viewpoint video A, and therefore, the viewpoint video A is selected in this period. In the next period, the proportion of the area of the subject specified by the user 106 is larger in the viewpoint video C, and therefore, the viewpoint video C is selected in this period. In the last period, the proportion of the area of the subject specified by the user 106 is larger in the viewpoint video B, and therefore, the viewpoint video B is selected in this period. In doing so, a video formed by connecting a plurality of viewpoint videos together in accordance with the area of the subject is generated.

Note that the server 103 may perform control so as not to perform switching between viewpoint videos as long as the continuous replay time of a viewpoint video does not exceed a threshold, that is, until the continuous replay time exceeds the threshold. In doing so, it is possible to suppress frequent switching between viewpoint videos. For example, even in a case where the area of the subject becomes larger in the viewpoint video C than in the viewpoint video A, if the continuous replay time of the viewpoint video A does not exceed five seconds, for example, the server 103 keeps replaying the viewpoint video A. The server 103 performs switching at a timing of switching to the viewpoint video C only in a case where the subject is visible in the viewpoint video C for two seconds or longer, for example.

Figure 13:
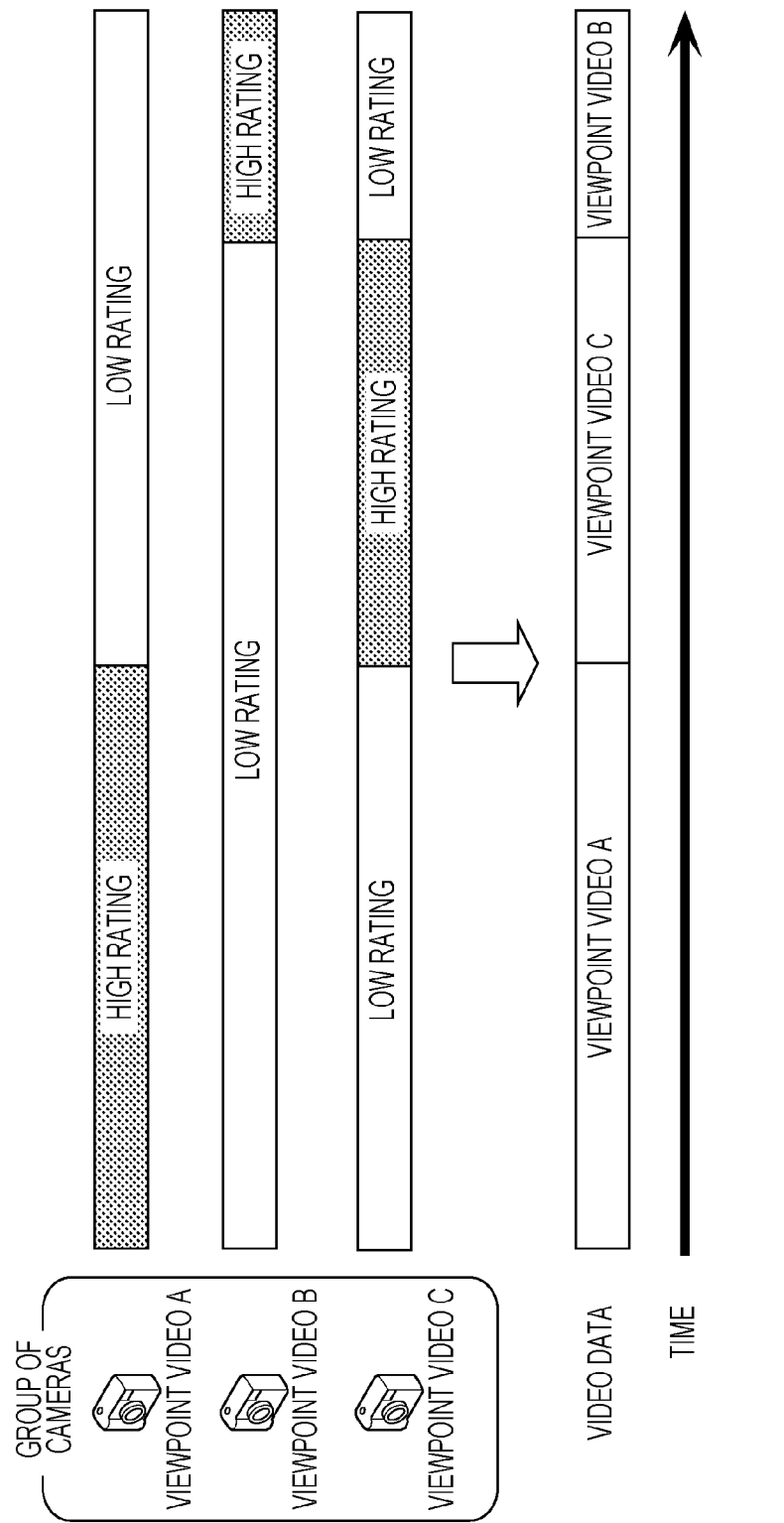
FIG. 13 is a diagram illustrating an example of an operation in a recommended viewpoint video switching mode according to the first embodiment.

FIG. 13 is a diagram illustrating an example of an operation in the recommended viewpoint video switching mode. As illustrated in FIG. 13, the server 103 switches between viewpoint videos for each period in accordance with statistical data about highly rated viewpoint videos to thereby generate video data to be transmitted to the terminal device 102. Note that the server 103 may control switching on the basis of the continuous replay time similarly to the case of the favorite subject switching mode.

Figure 14:
FIG. 14 is a diagram illustrating an example of an operation in a recommended subject switching mode according to the first embodiment.

FIG. 14 is a diagram illustrating an example of an operation in the recommended subject switching mode. As illustrated in FIG. 14, the server 103 selects a plurality of viewpoint videos that include a highly rated subject from among viewpoint videos stored in the accumulation unit 122 and switches between the selected viewpoint videos for each period in accordance with the proportion of the area of the subject in each video to thereby generate video data to be transmitted to the terminal device 102.

Note that the server 103 may control switching on the basis of the continuous replay time similarly to the case of the favorite subject switching mode.

Although the process has been described above, for example, where in the case where switching described above is performed, the server 103 generates a single video stream by performing switching and transmits the video stream to the terminal device 102, part of the process may be performed by the terminal device 102. For example, the server 103 may transmit a plurality of viewpoint videos and information indicating timings of switching between the viewpoint videos to the terminal device 102, and the terminal device 102 may switch between viewpoint videos for replay (display) among the plurality of viewpoint videos on the basis of the information.

Figure 15:
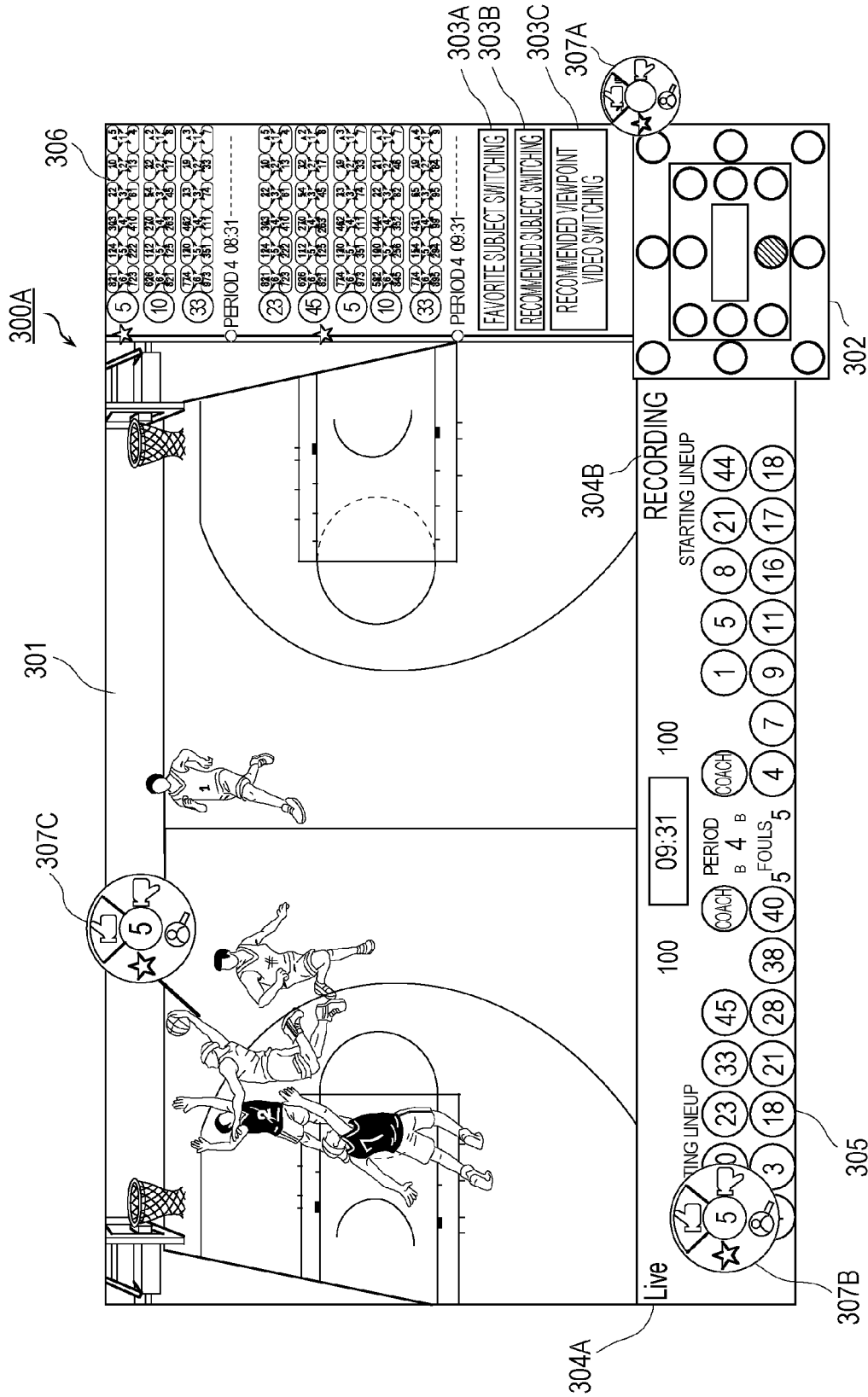
FIG. 15 is a diagram illustrating an example of a display screen according to the first embodiment.

Hereinafter, an example of a display screen of the terminal device 102 is described. FIG. 15 is a diagram illustrating an example of an output screen of the terminal device 102. FIG. 15 illustrates a state where a live video is displayed.

An output screen 300A illustrated in FIG. 15 includes a viewpoint video display screen 301, a viewpoint selection screen 302, operation buttons 303A to 303C, 304A, and 304B, and information display screens 305 and 306.

On the viewpoint video display screen 301, a viewpoint video selected by the user or video data generated by the server 103 in a mode selected by the user is displayed.

When the user selects a player on the viewpoint video display screen 301 by performing a touch or mouse-click operation or the like, a circle operation menu 307C is displayed. The operation menu 307C includes a plurality of menus, namely, a "high rating" menu, a "low rating" menu, a "player information" menu, and a "favorite" menu, which are arranged clockwise from the top of the circle. When the user selects the "high rating" or "low rating" menu, a rating (high rating or low rating) is given to the selected player (subject rating giving mode).

Note that a rating may be given using any method, such as a method of giving a rating as points from one to six points or a method of giving a rating as a comment or the like saying "very good", "good", or the like. As the method of rating, a method of communicating a comment with a picture or the like may be used as well as with text or by voice.

The values of points may be increased by setting an upper limit on the number of points that each user can give. Further, the upper limit of the number of points that each user can give may be increased when the user pays.

When the user selects the "player information" menu, information about the player, such as comments or ratings on the player, information about related items, or the records of the player, is displayed (subject information obtaining mode).

When the user selects the "favorite" menu, a viewpoint video at the time of selection or around the time of selection may be registered as a favorite play of the selected player (subject rating giving mode).

The server 103 or the terminal device 102 may access a website or the like related to the information about related items, the records of the player, or other information about the player, and the terminal device 102 may display the content of the website or the like. The server 103 or the terminal device 102 may access a website or the like from which related items can be purchased, and the terminal device 102 may display the content of the website. As a result, the viewer can easily purchase an item while watching a game. Accordingly, the provider of this service can connect the viewer with the item selling company via the service and can expect an effect of earning a profit from the item selling company, for example.

When the user selects the "favorite" menu, the selected player is registered as a favorite player of the user. A player registered in the favorite subject switching mode is used as a favorite subject.

Although the example where only one viewpoint video display screen 301 is present is illustrated here, a plurality of viewpoint video display screens may be displayed simultaneously. For example, three viewpoint video display screens may be included in an output screen, a viewpoint video in which the entire court is visible may be displayed on a first viewpoint video display screen, a viewpoint video specified by the user may be displayed on a second viewpoint video display screen (favorite viewpoint video switching mode), and a viewpoint video of a subject specified by the user may be displayed on a third viewpoint video display screen (favorite subject switching mode). On the viewpoint video display screen 301, a video created by combining a plurality of viewpoint videos may be displayed. In this case, when the user changes the angle right and left and up and down while keeping touching the screen, for example, multi-angle viewing is enabled.

On the viewpoint video display screen 301, a highly rated player may be highlighted and displayed. For example, the outline of a highly rated player may be illuminated and displayed.

The viewpoint selection screen 302 shows a diagram illustrating the positions of the plurality of cameras 101 (viewpoint positions of viewpoint videos). In the example illustrated in FIG. 15, the positions of the plurality of cameras 101 are represented by circles on the top view of the game venue, for example.

The position represented by the hatched circle indicates the viewpoint position of the viewpoint video that is currently being displayed on the viewpoint video display screen 301. When the user selects the circle corresponding to each viewpoint position by performing a touch or mouse-click operation or the like, the viewpoint video that is displayed is switched to the viewpoint video corresponding to the viewpoint position (favorite viewpoint video switching mode).

Note that the viewpoint position of a highly rated viewpoint video may be highlighted and displayed on the viewpoint selection screen 302. The server 103 may analyze audio data about cheers and the like measured at each viewpoint position, and a viewpoint position at which loudest cheers are heard at the time may be highlighted and displayed on the viewpoint selection screen 302. Further, switching to and display of a viewpoint video in which loudest cheers are heard may be performed for each period.

When the user selects a viewpoint position on the viewpoint selection screen 302 by keeping touching or mouse-clicking the viewpoint position, a circle operation menu 307A is displayed. Operations related to the operation menu 307A are similar to those related to the above-described operation menu 307C except that the target is a viewpoint video instead of a player (subject).

Specifically, the operation menu 307A includes a plurality of menus, namely, a "high rating" menu, a "low rating" menu, a "viewpoint video information" menu, and a "favorite" menu, which are arranged clockwise from the top of the circle. When the user selects the "high rating" or "low rating" menu, a rating (high rating or low rating) is given to the selected viewpoint video (viewpoint video rating giving mode). Note that a rating may be given using any method, such as a method of giving a rating as points from one to six points or a method of giving a rating as a comment or the like saying "very good", "good", or the like.

When the user selects the "viewpoint video information" menu, comments or ratings on the viewpoint video, a profile of the videographer of the viewpoint video, information about other content created by the videographer of the viewpoint video, or the like are displayed (viewpoint video information obtaining mode).

When the user selects the "favorite" menu, a viewpoint video at the time of selection or around the time of selection may be registered as a favorite time period of the selected viewpoint video (viewpoint video rating giving mode). The registered favorite time period is used in a case of recording viewing. For example, in the case of recording viewing, another viewpoint video corresponding to the favorite time period is displayed.

When the user selects the "favorite" menu, the selected viewpoint video is registered as a favorite video. The registered favorite video is used as a viewpoint video in the favorite viewpoint video switching mode.

The operation buttons 303A to 303C are buttons for selecting the favorite subject switching mode, the recommended subject switching mode, and the recommended viewpoint video switching mode respectively.

The operation buttons 304A and 304B are buttons for switching between a live video and a recorded video. For example, when the user selects the operation button 304A, a live video is displayed on the viewpoint video display screen 301. When the user selects the operation button 304B, a recorded video is displayed on the viewpoint video display screen 301.

On the information display screen 305, information about the current game or the like is displayed. For example, the numbers in the circles illustrated in FIG. 15 represent the uniform numbers of the players. For example, the uniform numbers on the upper row represent the uniform numbers of the players who are currently playing in the game, and the uniform numbers on the lower row represent the uniform numbers of backup players.

When the user selects the uniform number of a player by performing a touch or mouse-click operation or the like, a circle operation menu 307B is displayed. Operations related to the operation menu 307B are similar to those related to the above-described operation menu 307C.

On the information display screen 306, a summary or the like of ratings on subjects (players) given by users is displayed. Similarly to the information display screen 305, the numbers in the circles represent the uniform numbers of the players. To the right of each uniform number, ratings on the player having the uniform number given by a plurality of users are indicated. Specifically, the numbers of high ratings are indicated on the upper row, and the numbers of low ratings are indicated on the lower row. In the example illustrated in FIG. 15, the high ratings and low ratings are each given on the basis of six levels (1 to 6), and the number of given ratings is indicated for each level. These ratings are summarized for each predetermined period, and the summary values are displayed.

On the left edge of the information display screen 306, the longitudinal direction is assumed to represent time, and the times at which corresponding scenes are registered as favorite scenes are indicated by stars.

When the user clicks on the uniform number of a player, comments and ratings given to the player are displayed in detail.

The summary values displayed on the information display screen 306 may be updated at a certain interval. Alternatively, the summary values may be updated each time a rating is given by a user. Points given to a subject may be fed back to the subject by reflecting the points in the annual salary of the subject, for example.

Figure 16:
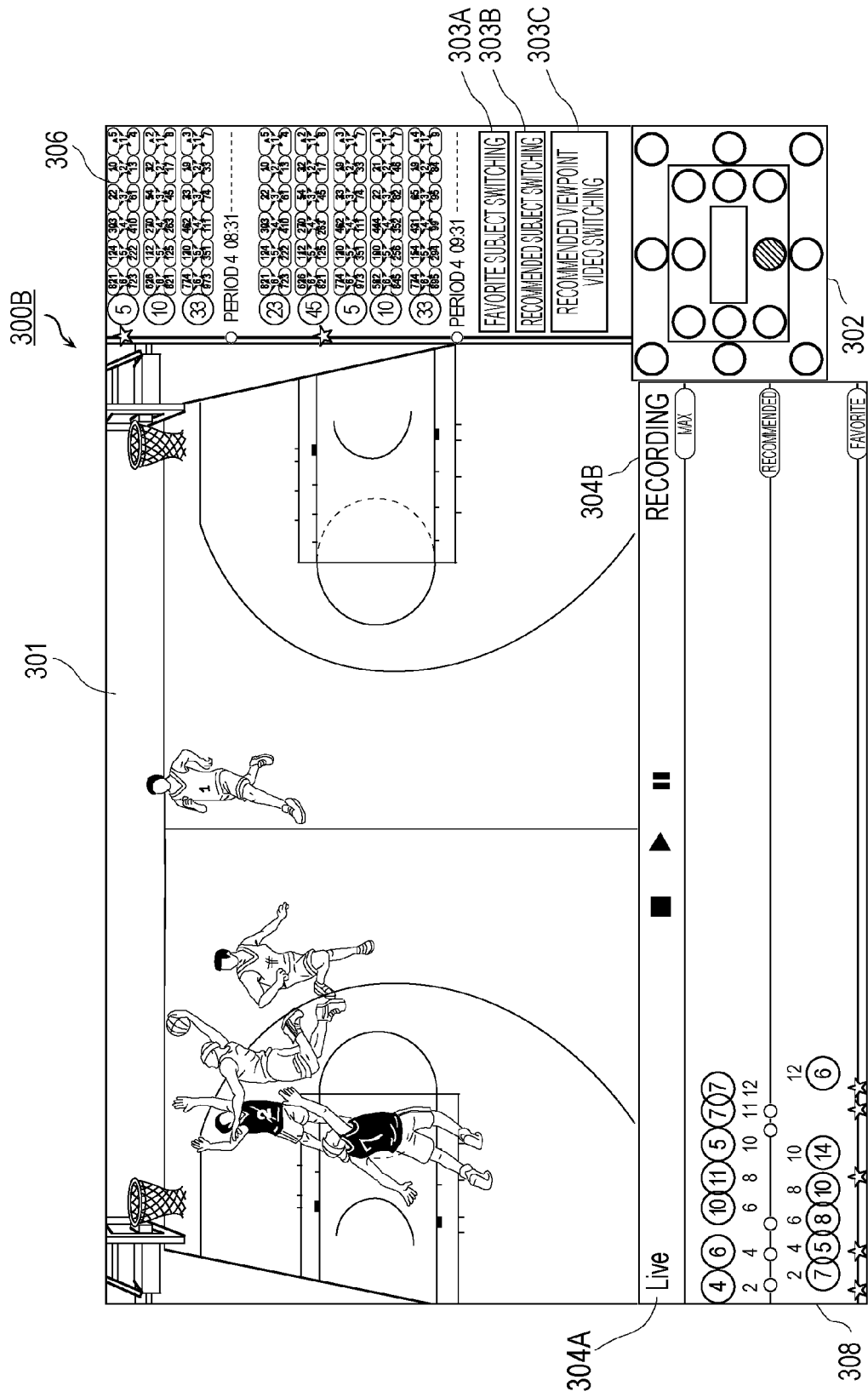
FIG. 16 is a diagram illustrating an example of a display screen according to the first embodiment.

FIG. 16 is a diagram illustrating an example of an output screen of the terminal device 102. FIG. 16 illustrates a state where a recorded video is displayed. For example, an output screen 300B illustrated in FIG. 16 is displayed when the user selects the operation button 304B on the output screen 300A illustrated in FIG. 15.

The output screen 300B illustrated in FIG. 16 includes an information display screen 308 instead of the information display screen 305 in the output screen 300A illustrated in FIG. 15.

The lateral direction of the information display screen 308 represents time, and the degree of excitement (volume of cheers or the like, for example) is represented by a wave. The stars on the lower row represent the times at which corresponding scenes are registered as favorite scenes. The circles on the middle row represent the times of recommended scenes. The numbers in the circles on the lower row represent the uniform numbers of the players of one team who have gained points, and the numerical values immediately above the respective uniform numbers represent the scores. Similarly, the numbers in the circles on the upper row represent the uniform numbers of the players of the other team who have gained points, and the numerical values immediately below the respective uniform numbers represent the scores.

In a case where a viewpoint video that is distributed as a recommended video is viewed by a larger number of people, points may be given to the videographer of the viewpoint video.

When a recorded video is displayed, view points may be displayed in accordance with a viewpoint video or subject registered by users as a favorite, a highly rated viewpoint video or subject, or audio data of cheers or the like.

In a case where a subject is selected, a series of plays corresponding to ratings given to the subject may be displayed as a ranking list or the like, and the series of plays may be replayed. For example, in a case where the user selects a player having the uniform number 5, a series of plays in which a larger number of points (for example, six points) have been given to the player having the uniform number 5 is displayed, and one play selected from among the plays is replayed.

In a case of displaying a comment related to each rating, a list of viewpoint videos captured by a user who has made the comment may be displayed simultaneously. A videographer may be registered as a favorite or the like. In this case, a mode may be provided in which only viewpoint videos captured by the videographer registered as a favorite can be viewed.

Figure 17:
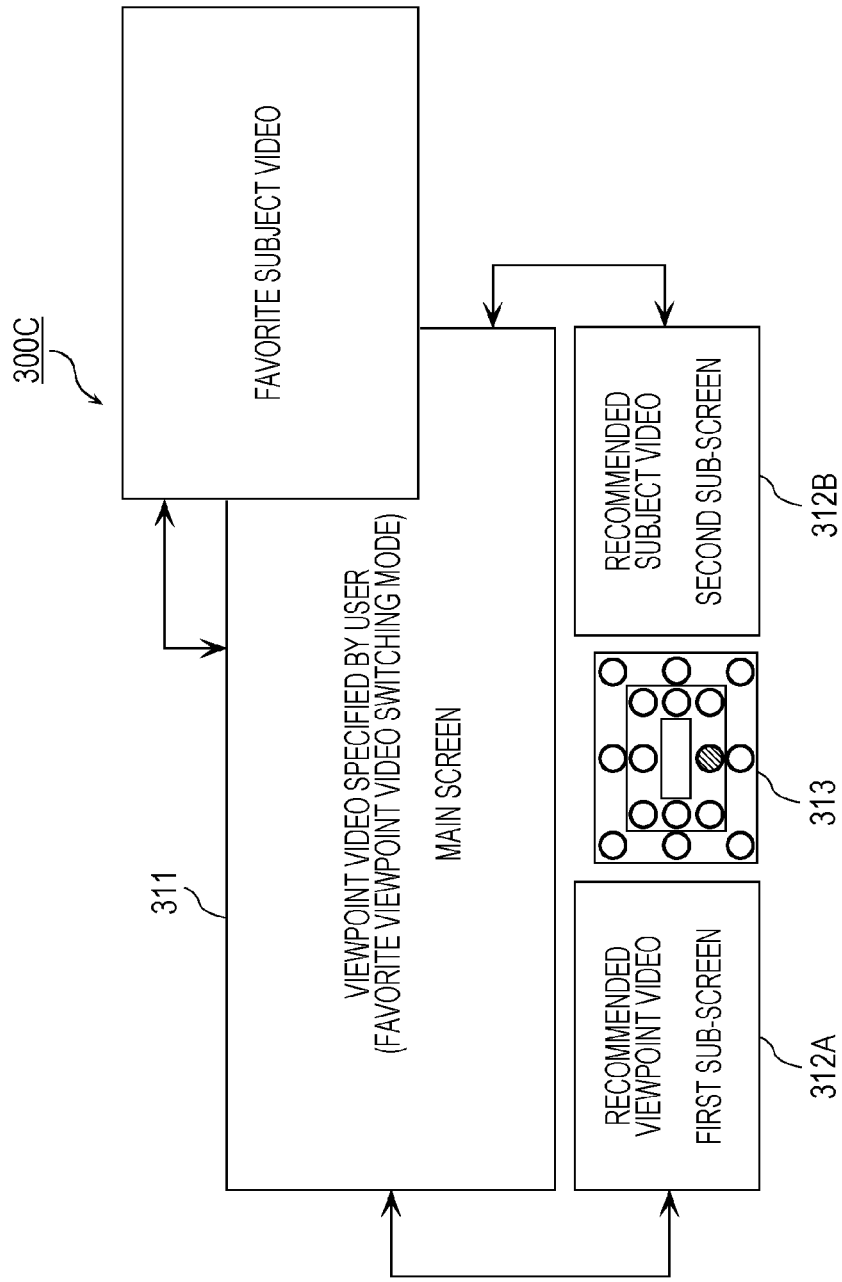
FIG. 17 is a diagram illustrating an example of a display screen according to the first embodiment.

FIG. 17 is a diagram illustrating another example of an output screen according to this embodiment. An output screen 300C illustrated in FIG. 17 includes a main screen 311, a first sub-screen 312A, a second sub-screen 312B, and a viewpoint selection screen 313.

On the main screen 311, a viewpoint video specified by the user is displayed (favorite viewpoint video switching mode). On the first sub-screen 312A, a recommended viewpoint video generated in the above-described recommended viewpoint video switching mode is displayed. On the second sub-screen 312B, a recommended subject video generated in the above-described recommended subject switching mode is displayed.

When the user clicks on the first sub-screen 312A in this state, the recommended viewpoint video is displayed on the main screen 311, and a secondary recommended viewpoint video is displayed on the first sub-screen 312A.

Similarly, when the user clicks on the second sub-screen 312B, the recommended subject video is displayed on the main screen 311, and a secondary recommended subject video is displayed on the second sub-screen 312B.

In a case where the user specifies a subject in the viewpoint video displayed on the main screen 311 by performing a click operation or the like, the mode transitions to the favorite subject switching mode, and a tracking video of the specified subject is displayed. When the user clicks on the main screen 311 while the favorite subject video is being displayed, the display is switched to the viewpoint video that has been previously viewed.

Here, although the example is illustrated where a recommended viewpoint video and a recommended subject video are displayed on the first sub-screen 312A and the second sub-screen 312B respectively, a first recommended viewpoint video may be displayed on the first sub-screen 312A, and a second recommended viewpoint video may be displayed on the second sub-screen 312B. Similarly, a first recommended subject video may be displayed on the first sub-screen 312A, and a second recommended subject video may be displayed on the second sub-screen 312B.

The display on the first sub-screen 312A and the second sub-screen 312B may be turned off, and the information display screen 305, 306, or 308 illustrated in FIG. 15 or FIG. 16 may be displayed.

When the user double-clicks on the main screen 311, for example, only the main screen 311 may be displayed on the display in full-screen mode.

Note that the viewpoint selection screen 313 is similar to the viewpoint selection screen 302 illustrated in FIG. 15 and FIG. 16.

Hereinafter, a method for delivering videos (tracking videos) edited by the server 103 to the terminal device 102 is described. First, the server 103 generates a first tracking video of a subject A and a second tracking video of a subject B. Here, although the example of generating two tracking videos is described for simplifying the description, three or more tracking videos may be generated. A video transmitted from the server 103 is not limited to a tracking video, and may be one of the viewpoint videos or may be a favorite viewpoint video, a recommended viewpoint video, or the like.

The server 103 transmits the plurality of generated videos to the terminal device 102 through multicasting (broadcasting). Specifically, the server 103 delivers the first tracking video on the first channel and the second tracking video on the second channel. The terminal device 102 switches between the videos for display by switching between the channels in accordance with a user request.

By using this method, a needed band can be made constant. As a result, it is possible to easily handle a case where there are a large number of users (a large number of terminal devices 102).

Although there is an issue of difficulty in handling a case of a large number of users because of the varying needed band, one video desired by a user may be transmitted from the server 103 to a certain terminal device 102 or may be transmitted and received between terminal devices 102. In a case of a smaller number of users, a needed band can be made narrower, which is an advantage.

Hereinafter, a process to be performed in a case where a communication error occurs is described.

Ideally, the server 103 generates recommended viewpoint videos or recommended subject videos in accordance with the results of ratings given by users. However, it is not possible to generate or transmit these videos in the following cases.

First, the following cases may arise between the server 103 and the terminal device 102.

(1) One of the cases is a case where a transmission video (recommended viewpoint video, recommended subject video, or the like) has a large amount of data relative to a reception band that can be used by the terminal device 102. In this case, any of the following methods can be employed.

(1-1) The server 103 lowers the resolution or the frame rate of the transmission video, re-encodes the transmission video, and transmits the resulting video to the terminal device 102. In doing so, a transmission video having a reduced amount of data is used.

Note that the server 103 may generate a plurality of video signals having respective bit rates by converting the resolution or the frame rate of a viewpoint video transmitted from the camera 101 and store the plurality of video signals in advance.

In a case where the bandwidth usable by the terminal device 102 changes during viewing, the server 103 may switch between transmission videos in accordance with the usable bandwidth.

The server 103 may determine the number of videos to be transmitted in accordance with a communication band usable by the terminal device 102. Specifically, the server 103 increases the number of transmission videos as the communication band becomes wider.

(1-2) The server 103 uses another video that is similar to the target video (for example, another video captured at a position closer to that of the target video or another video including subjects similar to those in the target video) and that has a smaller amount of data as a substitution.

(2) The other of the cases is a case where a video that is not allowed to be distributed or a region that is not allowed to be viewed as a result of distribution is included in a transmission video or a viewpoint video used to generate a transmission video. In this case, any of the following methods can be employed.

(2-1) The server 103 uses another video that is similar to the target video (for example, another video captured at a position closer to that of the target video or another video including subjects similar to those in the target video) and that has no problem as a substitution.

(2-2) The server 103 uses another highly rated video as a substitution. For example, in a case where a video having the second highest rating does not have a similar problem, the server 103 uses the video as a substitution.

Further, the following cases may arise between the camera 101 (videographer) and the server 103.

Specifically, (3-1) a case where a video from the camera 101 does not arrive at the server 103 due to packet loss or the like, (3-2) a case where the band of the camera 101 is unstable and data transfer to the server 103 is delayed, and (3-3) a case where the videographer suddenly discontinues capturing a video (because the battery runs out or a thermal issue arises, for example) may occur. In these cases, any of the following methods can be employed.

(4-1) The server 103 uses a highly rated viewpoint video or another video that is similar to the subject video (for example, another video captured at a position closer to that of the subject video or another video including subjects similar to those in the subject video) as a substitution.

(4-2) The server 103 uses another highly rated video as a substitution. For example, the server 103 uses a video having the second highest rating as a substitution.

Hereinafter, a method for transmitting a video other than videos highly rated by users is described.

Here, an unpopular viewpoint video is a video not viewed by a large number of people, that is, a video gaining little attention. Specifically, an unpopular viewpoint video is a video that is replayed a small number of times, a video having a low rating, a video on which a small number of ratings or comments have been given, or the like. However, such a viewpoint video may be valuable to some people, and therefore, the server 103 may connect viewpoint videos gaining little attention together and deliver the connected viewpoint videos. For example, the system described above can be used for surveillance purpose (applied to a surveillance system including a plurality of surveillance cameras). Here, a case is assumed where videos from the plurality of surveillance cameras are monitored by a plurality of persons. In this case, although a viewpoint video watched by the plurality of persons is sufficiently monitored, a viewpoint video not watched by a sufficient number of persons is likely to cause a blind spot. Therefore, the server 103 connects viewpoint videos gaining little attention (viewpoint videos watched by a small number of persons) together and delivers the connected viewpoint videos. The connected videos are displayed on a separate screen beside the viewpoint video that the guards are watching. Accordingly, it is possible to reduce blind spots that the guards fail to monitor.

In a case where there is a viewpoint video that does not gain attention for a certain time period, a notification or warning about the viewpoint video may be sent to the guards, or information indicating the viewpoint video not gaining attention may be communicated to the guards. Here, a viewpoint video that does not gain attention for a certain time period is a viewpoint video that is not replayed for a certain time period, for example. In a case where a plurality of viewpoint videos are simultaneously displayed, a viewpoint video that does not gain attention for a certain time period may be a viewpoint video that is not selected as a video to be displayed on the main screen for a certain time period or a viewpoint video that is not given a rating for a certain time period. A viewpoint video that does not gain attention for a certain time period may be a video that is replayed a number of times equal to or smaller than a predetermined threshold, that is selected a number of times equal to or smaller than a predetermined threshold, or that is given a number of ratings equal to or smaller than a predetermined threshold.

For example, on the viewpoint selection screen 302 illustrated in FIG. 15 or the like, the viewpoint position of a viewpoint video that does not gain attention for a certain time period may be highlighted and displayed. For example, the color of the viewpoint position may be changed to a color different from those of other viewpoint positions. As a result, it is possible to urge the guards to monitor the viewpoint video that does not gain attention.

Figure 18:
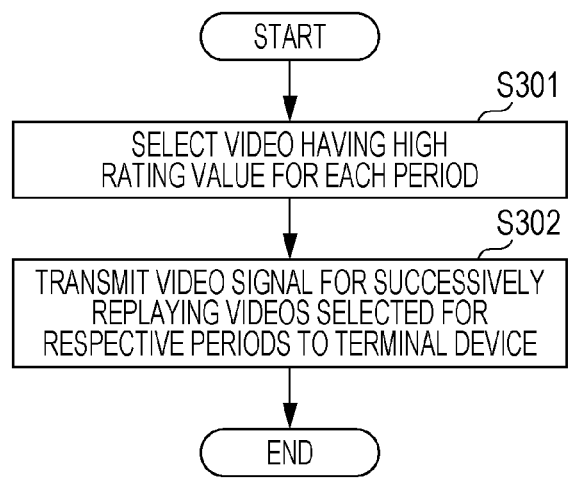
FIG. 18 is a flowchart of a video delivery method performed by the server according to the first embodiment.

As describe above, the server 103 according to this embodiment performs the process illustrated in FIG. 18.

The server 103 delivers to the terminal device 102 a first video signal based on a plurality of videos obtained by shooting the same scene from a plurality of different viewpoints over a plurality of successive periods.

First, the server 103 selects a first selected video from among a plurality of videos for each of the plurality of periods on the basis of rating values given to the plurality of videos by a plurality of users (step S301). Specifically, the server 103 selects a video having a high rating value as the first selected video.

More specifically, as described in the above description of the recommended viewpoint video switching mode, a rating value is a rating value of each of the plurality of videos, and the server 103 selects, for each of the plurality of periods, a video having the highest rating value or having a rating value higher than a predetermined value in the period from among the plurality of videos as the first selected video.

Alternatively, as described in the above description of the recommended subject switching mode, a rating value is a rating value of each of a plurality of subjects included in the plurality of videos, and the server 103 selects, for each of the plurality of periods, a video in which a recommended subject having the highest rating value or having a rating value higher than a predetermined value is visible from among the plurality of videos as the first selected video. For example, the server 103 selects a video in which a recommended subject having a largest area is visible from among the plurality of videos as the first selected video.

Alternatively, as described in the above description of the method for transmitting a video other than videos highly rated by users, a rating value is a rating value of each of the plurality of videos, and the server 103 may select, for each of the plurality of periods, a video having a rating value lower than a predetermined value in the period from among the plurality of videos as the first selected video.

Next, the server 103 transmits to the terminal device 102 the first video signal for successively replaying a plurality of first selected videos respectively selected for the plurality of periods (step S302). Specifically, the server 103 generates a video signal by connecting a plurality of selected videos respectively selected for the plurality of periods together and transmits the video signal to the terminal device 102. Alternatively, the server 103 transmits, as a video signal, the plurality of videos and information for identifying selected videos respectively selected for the plurality of periods to the terminal device 102. In this case, the terminal device 102 generates the video signal by connecting the plurality of selected videos respectively selected for the plurality of periods together by using the information.

As described in the above description of the process to be performed in the case where a communication error occurs, if the amount of data of the first video signal is larger than an upper limit based on the reception band of the terminal device 102, the server 103 further selects a second selected video from among the plurality of videos for each of the plurality of periods on the basis of the rating values of the plurality of videos and transmits to the terminal device 102 a second video signal for successively replaying a plurality of second selected videos respectively selected for the plurality of periods. Here, at least one of the second selected videos respectively selected for the plurality of periods is different from the first selected videos respectively selected for the plurality of periods, and the amount of data of the second selection signal is smaller than the upper limit.

The plurality of videos are transmitted from the plurality of cameras 101 to the server 103 in real time, and the server 103 selects, in a case where transmission of a video corresponding to a first selected video from the camera 101 is discontinued, a second selected video different from the first selected video and transmits a second video signal for replaying the second selected video to the terminal device 102.

Figure 19:
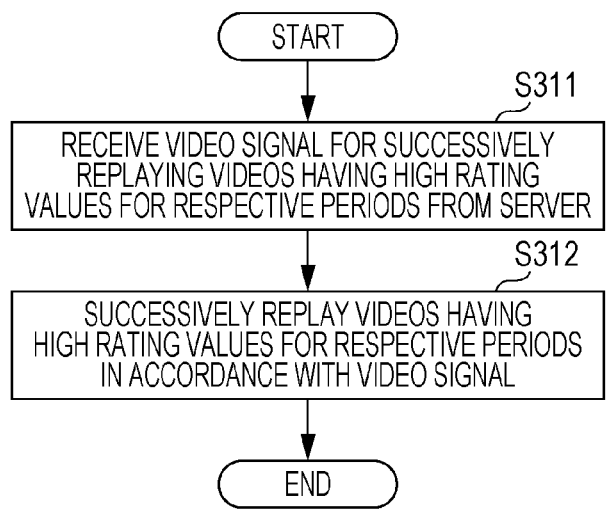
FIG. 19 is a flowchart of a video reception method performed by the terminal device according to the first embodiment.

The terminal device 102 according to this embodiment performs the process illustrated in FIG. 19.

The terminal device 102 receives from the server 103 a video signal based on a plurality of videos obtained by shooting the same scene over a plurality of successive periods from a plurality of different viewpoints.

First, the terminal device 102 receives from the server 103 a video signal for successively replaying a plurality of selected videos selected from among the plurality of videos for the plurality of periods on the basis of the rating values of the plurality of videos given by a plurality of users (step S311). Specifically, the selected videos are videos having high rating values.

More specifically, as described in the above description of the recommended viewpoint video switching mode, a rating value is a rating value of each of the plurality of videos, and a selected video is a video that is selected from among the plurality of videos for each of the plurality of periods and that has the highest rating value or a rating value higher than a predetermined value in the period.

Alternatively, as described in the above description of the recommended subject switching mode, a rating value is a rating value of each of a plurality of subjects included in the plurality of videos, and a selected video is a video which is selected from among the plurality of videos for each of the plurality of periods and in which a subject having the highest rating value or having a rating value higher than a predetermined value is visible.

Alternatively, as described in the above description of the method for transmitting a video other than videos highly rated by users, a rating value is a rating value of each of the plurality of videos, and a selected video is a video that is selected from among the plurality of videos for each of the plurality of periods and that has a rating value lower than a predetermined value in the period.

Next, the terminal device 102 successively replays the plurality of selected videos in accordance with the received video signal (step S312). Specifically, the terminal device 102 receives the video signal generated by the server 103 connecting the plurality of selected videos respectively selected for the plurality of periods together and reproduces the video signal. Alternatively, the terminal device 102 receives from the server 103 the plurality of videos and information for identifying each selected video selected for each of the plurality of periods, generates a video signal by connecting the plurality of selected videos respectively selected for the plurality of periods together by using the information, and reproduces the video signal.

The terminal device 102 may display any of the plurality of videos and may highlight and display a subject having the highest rating value or a rating value higher than a predetermined value among a plurality of subjects included in the displayed video.

As illustrated in FIG. 15, the terminal device 102 may display any of the plurality of videos and, in a case where any subject is selected by the user from among a plurality of subjects included in the displayed video, may display the operation menu 307C for rating the selected subject.

The terminal device 102 may display any of the plurality of videos and, in a case where any subject is selected by the user from among a plurality of subjects included in the displayed video, may display a list of videos for the plurality of periods among the plurality of videos, the videos in the list including the selected subject and having rating values higher than a predetermined value.

As illustrated in FIG. 17, the terminal device 102 may display any of the plurality of videos and, in a case where any subject is selected by the user from among a plurality of subjects included in the displayed video, may display a tracking video that is a video obtained by connecting a plurality of videos together for tracking the selected subject.

As illustrated in FIG. 17, the terminal device 102 may display the output screen 300C that includes a first screen (main screen 311) on which any of the plurality of videos is displayed and a second screen (first sub-screen 312A or second sub-screen 312B) which is smaller than the first screen and on which a plurality of selected videos that are replayed are displayed, and may display the plurality of selected videos on the first screen in a case where the second screen is selected by the user.

Note that part of the process performed by the server 103 may be performed by the terminal device 102, and part of the process performed by the terminal device 102 may be performed by the server 103. That is, the video delivery system 100 according to this embodiment reproduces (for display) a video signal based on a plurality of videos obtained by shooting the same scene over a plurality of successive periods from a plurality of different viewpoints. The video delivery system 100 selects a selected video from among the plurality of videos for each of the plurality of periods on the basis of the rating values of the plurality of videos given by a plurality of users. The video delivery system 100 generates a video signal by connecting the plurality of selected videos respectively selected for the plurality of periods together and reproduces the video signal (for display).

Although the video delivery method, the video reception method, and the video delivery system according to this embodiment have been described, the present disclosure is not limited to this embodiment.

Each of the processing units of each apparatus included in the video delivery system according to the above-described embodiment is typically implemented as a large scale integration (LSI) circuit, which is an integrated circuit (IC). The processing units may each be implemented as one chip, or some or all of the processing units may be implemented as one chip.

Integration into a circuit may be implemented by using a dedicated circuit or a general-purpose processor instead of an LSI circuit. Alternatively, a field programmable gate array (FPGA) that is programmable after manufacturing the LSI circuit or a reconfigurable processor for which connections or configurations of circuit cells inside the LSI circuit are reconfigurable may be used.

In the above-described embodiment, each constituent element may be constituted by a dedicated hardware unit or may be implemented by executing a software program suitable to the constituent element. Each constituent element may be implemented by a program execution unit, such as a central processing unit (CPU) or a processor, reading and executing a software program recorded to a recording medium, such as a hard disk or a semiconductor memory.

In other words, each apparatus included in the video delivery system includes processing circuitry and storage electrically connected to the processing circuitry (accessible from the processing circuitry). The processing circuitry includes at least one of the dedicated hardware unit and the program execution unit. In a case where the processing circuitry includes the program execution unit, the storage stores therein a software program executed by the program execution unit. The processing circuitry performs the video delivery method or the video reception method according to the above-described embodiment by using the storage.

Alternatively, the present disclosure may relate to the above-described software program or a non-transitory computer-readable recording medium to which the program is recorded. The program may be distributed through a transmission medium, such as the Internet, as a matter of course.

Any numbers mentioned above are provided as examples in order to specifically describe the present disclosure and are not intended to restrict the present disclosure.

The above-described order of performing the steps included in the video delivery method or the video reception method is an example for specifically describing the present disclosure, and the steps may be performed in other orders than the above-described order. Alternatively, some of the steps may be performed simultaneously with (in parallel to) other steps.

Although the video delivery method, the video reception method, the video delivery system, the server, and the terminal device according to one or more aspects of the present disclosure have been described with reference to the embodiment, the present disclosure is not limited to the embodiment. Various modifications that are conceivable by a person skilled in the art and that are made on the embodiment, or a form configured by combining constituent elements in different embodiments may also fall within the scope of one or more aspects of the present disclosure without departing from the spirit of the present disclosure.

Second Embodiment

Examples of other applications of the configurations of the image processing methods and apparatuses described in the above-described embodiment and a system that employs the applications will be described. The system is applicable to video systems that become more intelligent and that target wider space, such as (1) a surveillance system installed on security cameras in stores or plants, onboard cameras mounted in police cars, and the like, (2) a traffic information system using privately owned cameras, onboard cameras, cameras placed along roads, and the like, (3) an environment survey system or delivery system using remotely operable or automatically controllable devices, such as drones, and (4) a content transmission/reception system for transmitting/receiving videos and the like using cameras placed in amusement facilities, stadiums, or the like, moving cameras mounted on drones and the like, privately owned cameras, or the like, for example.

Figure 20:
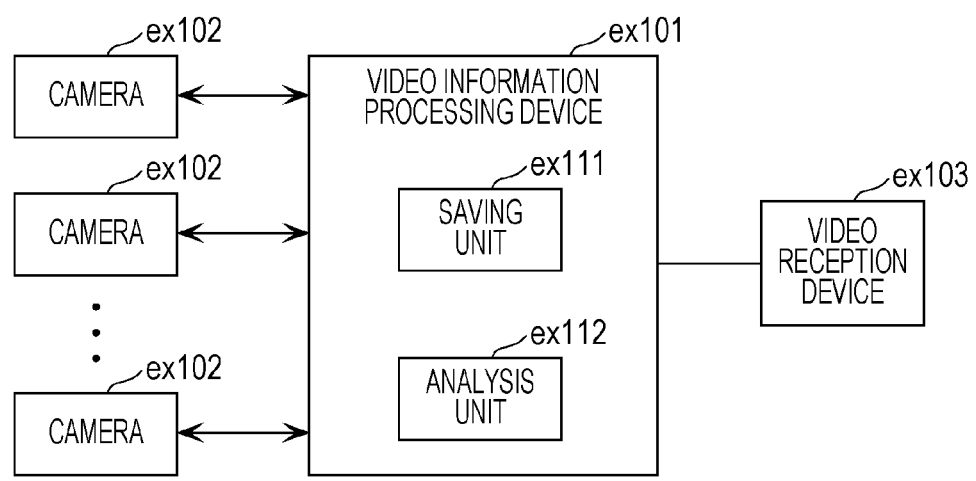
FIG. 20 is a diagram illustrating a configuration of a video information processing system.

FIG. 20 is a diagram illustrating a video information processing system ex100 according to this embodiment. In this embodiment, an example of preventing a blind spot from being created and an example of prohibiting image capture of a specific area will be described.

The video information processing system ex100 illustrated in FIG. 20 includes a video information processing device ex101, a plurality of cameras ex102, and a video reception device ex103. Note that the video reception device ex103 need not be included in the video information processing system ex100.

The video information processing device ex101 includes a saving unit ex111 and an analysis unit ex112. Each of N cameras ex102 has a function of capturing a video and a function of transmitting data of the captured video to the video information processing device ex101. The camera ex102 may have a function of displaying a video that is being captured. Note that the camera ex102 may transmit a video signal of the captured video to the video information processing device ex101 after performing encoding using a coding scheme, such as High Efficiency Video Coding (HEVC) or H.264, or may transmit video data that is not encoded to the video information processing device ex101.

Here, the cameras ex102 are each a fixed camera, such as a surveillance camera, a moving camera mounted on a radio-controlled pilotless aircraft, a vehicle, or the like, or a user camera owned by a user.

A moving camera receives an instruction signal transmitted from the video information processing device ex101 and changes its position or image capture direction in accordance with the received instruction signal.

The times set on the plurality of cameras ex102 are calibrated by using time information from a server or a reference camera before starting image capture. The spatial positions of the plurality of cameras ex102 are calibrated on the basis of how an object in space, which is an image capture target, is viewed or on the basis of the relative positions from the reference camera.

In the saving unit ex111 included in the video information processing device ex101, video data transmitted from the N cameras ex102 is saved.

The analysis unit ex112 detects a blind spot from the video data saved in the saving unit ex111 and transmits an instruction signal indicating an instruction to a moving camera for eliminating the blind spot to the moving camera. The moving camera moves in accordance with the instruction signal and continues image capture.

The analysis unit ex112 detects a blind spot by using a Structure from Motion (SfM) scheme. An SfM scheme is a technique for restoring the three-dimensional form of a subject from a plurality of videos captured from different positions and is generally known as a form restoration technique for simultaneously estimating the form of a subject and the positions of the cameras. For example, the analysis unit ex112 restores the three-dimensional form of a facility or a stadium from video data saved in the saving unit ex111 by using an SfM scheme and detects an area for which restoration fails as a blind spot.

In a case where the positions and image capture directions of the cameras ex102 are fixed and information about the positions and image capture directions are known, the analysis unit ex112 may perform an SfM process by using the known information. In a case where the position and image capture direction of a moving camera can be obtained from a GPS, an angle sensor, and the like mounted on the moving camera, the moving camera may transmit information about the position and image capture direction to the analysis unit ex112, and the analysis unit ex112 may perform an SfM process by using the transmitted information about the position and image capture direction.

The method for detecting a blind spot is not limited to the method of using an SfM scheme described above. For example, the analysis unit ex112 may grasp the spatial distance to a subject, which is an image capture target, by using information from a depth sensor, such as a laser rangefinder. The analysis unit ex112 may detect information about the position, image capture direction, zoom factor, and the like of a camera by determining whether a marker or a specific object set in advance in space is included in the image and, if the marker or specific object is included, on the basis of the size or the like of the marker or specific object. In doing so, the analysis unit ex112 detects a blind spot by using any method with which an image capture area of each camera can be detected. The analysis unit ex112 may obtain information about positional relationships or the like among a plurality of image capture targets from video data or from a proximity sensor or the like and identify an area in which a blind spot is highly likely to be created on the basis of the obtained positional relationships.

Here, examples of a blind spot include not only a portion for which a video is not obtained in an area for which an image is to be captured but also a portion having a poor image quality compared to other portions, a portion not satisfying a predetermined image quality, and the like. Such a portion that is to be detected may be set appropriately in accordance with the configuration or purpose of the system. For example, an image quality required for a specific subject in image capture space may be increased. On the other hand, an image quality required for a specific area in image capture space may be decreased. Setting may be performed so as not to determine a portion for which a video has not been captured to be a blind spot.

Note that the image quality described above includes various types of information about a video, such as information about the area (the number of pixels, for example) of a subject, which is an image capture target, in the video or information about whether a subject, which is an image capture target, is brought into focus. Determination as to whether a portion becomes a blind spot may be performed on the basis of any of these pieces of information or a combination thereof.

Although detection of an area that is actually a blind spot has been described above, an area that needs to be detected in order to prevent a blind spot from being created is not limited to an area that is actually a blind spot. For example, in a case where there are a plurality of image capture targets and at least some of the image capture targets are moving, an image capture target may come between another image capture target and a camera, which may create a new blind spot. In this case, the analysis unit ex112 may detect movements of the plurality of image capture targets from obtained video data or the like and may estimate an area that is likely to become a new blind spot on the basis of the detected movements of the plurality of image capture targets and position information about the cameras ex102, for example. Here, the video information processing device ex101 may transmit an instruction signal to a moving camera for instructing the moving camera to capture an image of an area that is likely to become a blind spot to thereby prevent a blind spot from being created.

In a case where there are a plurality of moving cameras, the video information processing device ex101 needs to select a moving camera to which an instruction signal for capturing an image of a blind spot or an area that is likely to become a blind spot is transmitted. In a case where there are a plurality of moving cameras and there are a plurality of blind spots or a plurality of areas that are likely to become blind spots, the video information processing device ex101 needs to determine, for each of the plurality of moving cameras, for which of the blind spots or for which of the areas that are likely to become blind spots an image is to be captured by the moving camera. For example, the video information processing device ex101 selects a moving camera nearest to a blind spot or an area that is likely to become a blind spot on the basis of the position of the blind spot or the area that is likely to become a blind spot and the positions of areas that the respective moving cameras are capturing images. The video information processing device ex101 may determine, for each of the moving cameras, whether a new blind spot is created in a case where video data that is currently being obtained by the moving camera becomes not obtainable, and may select a moving camera for which a blind spot is not created even if video data that is currently being obtained becomes not obtainable.

With the configuration described above, the video information processing device ex101 can detect a blind spot and transmits an instruction signal to a moving camera for eliminating a blind spot to thereby prevent a blind spot from being created.

First Modification

Although the example has been described in the above description where an instruction signal for instructing a moving camera to move is transmitted, the instruction signal may be a signal for instructing the user of a user camera to move. For example, the user camera displays an instruction image for instructing the user to change the direction of the camera. The user camera may display an instruction image indicating a movement path on a map as an instruction for the user to move. The user camera may display instructions on the details of image capture, such as the image capture direction, angle, angle of view, image quality, and a movement of the image capture area for increasing the quality of images to be obtained, and the video information processing device ex101 may automatically control feature values of the cameras ex102 related to the details of image capture if the feature values are controllable by the video information processing device ex101.

Here, the user camera is a smartphone, a tablet terminal, a wearable terminal, or a head-mounted display (HMD) carried by a spectator in a stadium or a guard in a facility.

A display terminal on which an instruction image is displayed need not be a user camera that captures a video. For example, a user camera may transmit an instruction signal or an instruction image to a display terminal that is associated in advance with the user camera, and the display terminal may display the instruction image. Information about a display terminal corresponding to a user camera may be registered in advance in the video information processing device ex101. In this case, the video information processing device ex101 directly transmits an instruction signal to the display terminal corresponding to the user camera to thereby display an instruction image on the display terminal.

Second Modification

The analysis unit ex112 may generate a free-viewpoint video (three-dimensional reconfiguration data) by using an SfM scheme, for example, and restoring the three-dimensional form of the facility or the stadium from video data saved in the saving unit ex111. The free-viewpoint video is saved in the saving unit ex111. The video information processing device ex101 reads from the saving unit ex111 video data corresponding to field-of-view information (and/or viewpoint information) transmitted from the video reception device ex103 and transmits the video data to the video reception device ex103. Note that the video reception device ex103 may be one of the plurality of cameras ex102.

Third Modification

The video information processing device ex101 may detect an image capture prohibition area. In this case, the analysis unit ex112 analyzes a captured image and, if a moving camera is capturing an image of an image capture prohibition area, transmits an image capture prohibition signal to the moving camera. The moving camera stops capturing an image as long as the moving camera receives an image capture prohibition signal.

The analysis unit ex112 matches three-dimensional virtual space restored by using an SfM scheme with a captured video to thereby determine whether a moving camera set in advance in space is capturing an image of an image capture prohibition area. Alternatively, the analysis unit ex112 determines whether a moving camera is capturing an image of an image capture prohibition area while using a marker or a characteristic object placed in space as a trigger. An image capture prohibition area is a toilet or the like in a facility or a stadium, for example.

In a case where a user camera is capturing an image of an image capture prohibition area, the user camera may display a message on a display or the like connected to the user camera through wired or wireless connections or output a beep or sound from a speaker or an earphone to thereby notify the user that the current place is an image capture prohibition place.

For example, as the above-described message, a message is displayed indicating that image capture in the direction in which the camera is currently facing is prohibited. Alternatively, an image capture prohibition area and the current image capture area are indicated on a map that is displayed. Image capture is restarted automatically when an image capture prohibition signal is no longer output, for example. Alternatively, image capture may be restarted in a case where an image capture prohibition signal is no longer output and the user performs an operation for restarting image capture. In a case where image capture is stopped and restarted a plurality of times in a short period, calibration may be performed again. A notification for making a user check the current position or urging the user to move may be sent.

In a case of special operations, such as police operations, a passcode, fingerprint authentication, or the like may be used to turn off the above-described function in order to allow recording. Even in such a case, if a video of an image capture prohibition area is externally displayed or saved, image processing for blurring or the like may be automatically performed.

With the configuration described above, the video information processing device ex101 determines whether image capture is prohibited and notifies a user that image capture is to be stopped to thereby set the area as an image capture prohibition area.

Fourth Modification

Videos from a plurality of viewpoints need to be collected in order to structure three-dimensional virtual space from videos, and therefore, the video information processing system ex100 provides an incentive to a user who has transferred a captured video. For example, the video information processing device ex101 delivers a video at no cost or at a discount to a user who has transferred a captured video or gives the user points having a monetary value which can be used in an online or offline shop or game or points having a nonmonetary value such as a social status in virtual space, such as a game. The video information processing device ex101 specifically gives a high point to a user who has transferred a captured video corresponding to a valuable field of view (and/or viewpoint) for which a larger number of requests are made, for example.

Fifth Modification

The video information processing device ex101 may transmit additional information to a user camera on the basis of the result of an analysis performed by the analysis unit ex112. In this case, the user camera superimposes the additional information on a captured video and displays the result on a screen. Additional information is information about a player, such as the name, height, or the like of the player, in a case where a video is captured for a game played in a stadium, for example, and the name, a photograph of the face, or the like of the player is displayed in association with the player in the video. Note that the video information processing device ex101 may extract additional information by a search via the Internet on the basis of a partial area or the entire area of the video data. The camera ex102 may receive such additional information through short-range wireless communication based on Bluetooth (registered trademark) or the like or through visible light communication from lighting in a stadium or the like and may map the received additional information on video data. The camera ex102 may perform such mapping on the basis of a certain rule indicated by a table that is retained in a storage unit connected to the camera ex102 through wireless or wired connections and that indicates a correspondence between information obtained using a visible light communication technique and additional information or may perform such mapping by using the most probable combination obtained as a result of a search via the Internet.

In a surveillance system, information about an individual to be aware of is superimposed, for example, for a user camera carried by a guard in a facility to thereby make the surveillance system more sensitive.

Sixth Modification

The analysis unit ex112 matches a free-viewpoint video with a video captured by a user camera to thereby determine for which area in the facility or the stadium an image is being captured by the user camera. The method for determining an image capture area is not limited to this, and the various methods for determining an image capture area described in the above-described embodiments or other methods for determining an image capture area may be used.

The video information processing device ex101 transmits a past video to a user camera on the basis of the result of an analysis performed by the analysis unit ex112. The user camera superimposes the past video on a captured video or replaces the captured video with the past video, and displays the result on a screen.

For example, during a half-time break, highlights in the first half are displayed as a past video. Accordingly, a user can enjoy the highlights in the first half as a video in the direction in which the user is looking. Note that the past video is not limited to a video of highlights in the first half and may be a video of highlights in a past game played in the stadium. A timing at which the video information processing device ex101 delivers a past video is not limited to a time during a half-time break, and the video information processing device ex101 may deliver a past video after the end of the game or during the game, for example. In a case of delivery of a past video during the game, the video information processing device ex101 may deliver a video of a scene that may be missed by a user and that is assumed to be important on the basis of the result of an analysis performed by the analysis unit ex112. The video information processing device ex101 may deliver a past video only in a case where a user makes a request or may deliver a message related to delivery permission before delivering a past video.

Seventh Modification

The video information processing device ex101 may transmit advertisement information to a user camera on the basis of the result of an analysis performed by the analysis unit ex112. The user camera superimposes the advertisement information on a captured video and displays the result on a screen.

Advertisement information may be delivered immediately before delivering a past video during a half-time break or after the end of the game described in the sixth modification. As a result, the distributor can earn advertising revenues from the advertiser and can provide a video delivery service to a user at a low price or at no cost. The video information processing device ex101 may deliver a message related to advertisement delivery permission immediately before delivering advertisement information, may provide a service at no cost only in a case where a user views an advertisement, or may provide a service at a lower price compared to a case where a user does not view an advertisement.

When a user clicks on "order now" or the like in accordance with an advertisement, a staff member or an automatic delivery system of the site which grasps the position of the user by using the system or any position information delivers an ordered drink to the user's seat. Payment may be made by handing over money to the staff member or by using credit card information set in advance in an application or the like of a mobile terminal. An advertisement may include a link to an e-commerce website and may enable online shopping that provides usual door-to-door delivery or the like.

Eighth Modification

The video reception device ex103 may be one of the cameras ex102 (user cameras). In this case, the analysis unit ex112 matches a free-viewpoint video with a video captured by a user camera to thereby determine for which area in the facility or the stadium the user camera is capturing an image. The method for determining an image capture area is not limited to this.

For example, when a user performs a swipe operation in a direction of an arrow displayed on a screen, the user camera generates viewpoint information indicating that the viewpoint is to be moved in the direction. The video information processing device ex101 reads from the saving unit ex111 video data obtained by capturing an image of an area that is moved, in accordance with the viewpoint information, from the image capture area of the user camera which is determined by the analysis unit ex112 and starts transmitting the video data to the user camera. The user camera displays the video delivered from the video information processing device ex101 instead of the captured video.

In doing so, a user in a facility or a stadium can view a video from a viewpoint that the user likes by performing a simple operation, such as a swipe on a screen. For example, a spectator that watches a game on the third-base side of a ballpark can view a video from a viewpoint on the first-base side. In a surveillance system, a guard in a facility can view a video from a viewpoint that the guard wants to check, a video that is to be observed as instructed by a center in an interrupting manner, or the like by adaptively change the viewpoint by a simple operation, such as a swipe on a screen. Accordingly, the surveillance system can be made more sensitive.

Delivery of a video to a user in a facility or a stadium is effective also in a case where an obstacle is present between the user camera and an image capture target and there is an area that cannot be viewed, for example. In this case, the user camera may switch a video of a partial area of the image capture area of the user camera, the partial area including the obstacle, from the captured video to a video delivered from the video information processing device ex101 and display the delivered video or may switch the display from the captured video to the delivered video and display the delivered video in full-screen mode. Alternatively, the user camera may display a video in which a view target is seen through an obstacle by combining the captured video with the delivered video. With this configuration, even in a case where an image capture target cannot be viewed from the position of a user due to an obstacle, the user can view a video delivered from the video information processing device ex101, and therefore, an effect of the obstacle can be reduced.

In a case where a delivered video is displayed as a video of an area that cannot be viewed due to an obstacle, display switching control different from the above-described display switching control that is based on an input process performed by a user, such as a swipe on a screen, may be performed. For example, in a case where it is determined that an obstacle is included in an image capture area on the basis of information about a movement of a user camera and the image capture direction of the user camera and position information about an obstacle which is obtained in advance, display switching from the captured video to a delivered video may be automatically performed. In a case where it is determined that an obstacle that is not an image capture target is visible as a result of an analysis of captured video data, display switching from the captured video to a delivered video may be automatically performed. In a case where the area (for example, the number of pixels) of an obstacle included in a captured video exceeds a predetermined threshold or in a case where the ratio of the area of an obstacle to the area of an image capture target exceeds a predetermined ratio, display switching from the captured video to a delivered video may be automatically performed.

Display switching from a captured video to a delivered video and display switching from a delivered video to a capture video may be performed in accordance with an input process performed by a user.

Ninth Modification

The speed for transferring video data obtained by each camera ex102 to the video information processing device ex101 may be indicated on the basis of the degree of importance of the video data.

In this case, the analysis unit ex112 determines the degree of importance of video data saved in the saving unit ex111 or the degree of importance of the camera ex102 that has obtained the video data. Here, the degree of importance is determined on the basis of the number of persons or the number of moving objects included in the video, information about the image quality or the like of the video data, or a combination thereof, for example.

The degree of importance of video data may be determined on the basis of the position of the camera ex102 where the video data has been obtained or the image capture area of the video data. For example, in a case where a plurality of other cameras ex102 that are capturing images are present near a target camera ex102, the degree of importance of video data obtained by the target camera ex102 is decreased. Even in a case where the target camera ex102 is located away from the other cameras ex102, if there are a plurality of other cameras ex102 that are capturing images of the same area as that for which the target camera ex102 is capturing an image, the degree of importance of video data obtained by the target camera ex102 is decreased. The degree of importance of video data may be determined on the basis of whether a larger number of requests are made in the video delivery service. The method for determining the degree of importance is not limited to those described above or a combination thereof and may be any method as long as the method is suitable to the configuration or purpose of the surveillance system or video delivery system.

The degree of importance need not be determined on the basis of obtained video data. For example, the degree of importance of the camera ex102 that transmits video data to a terminal other than the video information processing device ex101 may be made higher. To the contrary, the degree of importance of the camera ex102 that transmits video data to a terminal other than the video information processing device ex101 may be made lower. As a result, in a case where a plurality of services that need to transmit video data share a communication band, the communication band can be controlled in a more flexible manner in accordance with the purpose or characteristics of each service. Accordingly, it is possible to prevent the quality of each service from being compromised due to unavailability of necessary video data.

The analysis unit ex112 may determine the degree of importance of video data by using a free-viewpoint video and a video captured by the camera ex102.

The video information processing device ex101 transmits a communication speed indication signal to the camera ex102 on the basis of the result of determination of the degree of importance performed by the analysis unit ex112. The video information processing device ex101 indicates a high communication speed for the camera ex102 that is capturing a video of a high degree of importance, for example. The video information processing device ex101 may transmit a signal not only for controlling the speed but also for indicating, for important information, a scheme for transmitting the information a plurality of times in order to reduce disadvantages caused by loss. As a result, communication throughout a facility or a stadium can be efficiently performed. Note that communication between the cameras ex102 and the video information processing device ex101 may be wired communication or wireless communication. The video information processing device ex101 may only control one of wired communication and wireless communication.

The camera ex102 transmits captured video data to the video information processing device ex101 at a communication speed indicated by the communication speed indication signal. In a case where the camera ex102 fails to retransmit captured video data a predetermined number of times, the camera ex102 may stop retransmitting the captured video data and start transferring the subsequent captured video data. As a result, communication throughout a facility or a stadium can be efficiently performed, and processing in the analysis unit ex112 can be performed at a higher speed.

In a case where a band assigned to the camera ex102 is not sufficient for transferring captured video data at an indicated communication speed, the camera ex102 may convert the captured video data into video data corresponding to a bit rate which can be transmitted at the indicated communication speed and transmit the converted video data, or may stop transferring the captured video data.

In a case where video data is used to prevent a blind spot from being created as described above, only a partial area of an image capture area included in captured video data may be needed in order to eliminate a blind spot. In this case, the camera ex102 may generate extraction video data by extracting only the area needed to prevent a blind spot from being created and transmit the generated extraction video data to the video information processing device ex101. With this configuration, it is possible to suppress creation of a blind spot with a narrower communication band.

In a case where additional information is superimposed and displayed or a video is delivered, for example, the camera ex102 needs to transmit position information and image capture direction information about the camera ex102 to the video information processing device ex101. In this case, the camera ex102 that is assigned a band insufficient for transferring video data may only transmit position information and image capture direction information which are detected by the camera ex102. In a case where the video information processing device ex101 estimates position information and image capture direction information about the camera ex102, the camera ex102 may convert captured video data into video data having a resolution required for estimating position information and image capture direction information and transmit the converted video data to the video information processing device ex101. With this configuration, a service of superimposing and displaying additional information or delivering a video can be provided to the camera ex102 that is assigned a narrow communication band. Further, the video information processing device ex101 can obtain information about image capture areas from a larger number of cameras ex102, which is also effective in a case of using information about image capture areas in order to detect an area that gains attention, for example.

Switching between video data transfer processes in accordance with an assigned communication band described above may be performed by the camera ex102 on the basis of the assigned communication band, or the video information processing device ex101 may determine an operation of each camera ex102 and transmit a control signal indicating the determined operation to each camera ex102. As a result, processing can be appropriately divided and performed in accordance with the processing load for determining switching between operations, the processing capacity of the camera ex102, a needed communication band, and the like.

Tenth Modification

The analysis unit ex112 may determine the degree of importance of video data on the basis of field-of-view information (and/or viewpoint information) transmitted from the video reception device ex103. For example, the analysis unit ex112 makes the degree of importance of captured video data that includes a larger area indicated by the field-of-view information (and/or viewpoint information) higher. The analysis unit ex112 may determine the degree of importance of video data by taking into consideration the number of persons or the number of moving objects included in the video. The method for determining the degree of importance is not limited to this.

Note that the communication control method described in this embodiment need not be used in a system that reconstructs a three-dimensional form from a plurality of pieces of video data. For example, in an environment where a plurality of cameras ex102 are present, in a case where pieces of video data are transmitted selectively or by changing the transmission speed through wired communication and/or wireless communication, the communication control method described in this embodiment is effective.

Eleventh Modification

In the video delivery system, the video information processing device ex101 may transmit a panorama video showing the entire scene that is shot to the video reception device ex103.

Specifically, when the video information processing device ex101 has received a delivery request transmitted from the video reception device ex103, the video information processing device ex101 reads a panorama video of the entire facility or stadium from the saving unit ex111 and transmits the panorama video to the video reception device ex103. The panorama video may be updated at a longer interval (may have a low frame rate) and may have a low image quality. A viewer touches a portion that the viewer wants to view closely in the panorama video displayed on the screen of the video reception device ex103. Then, the video reception device ex103 transmits field-of-view information (and/or viewpoint information) corresponding to the touched portion to the video information processing device ex101.

The video information processing device ex101 reads video data corresponding to the field-of-view information (and/or viewpoint information) from the saving unit ex111 and transmits the video data to the video reception device ex103.

The analysis unit ex112 generates a free-viewpoint video by preferentially performing three-dimensional form restoration (three-dimensional reconstruction) on the area indicated by the field-of-view information (and/or viewpoint information). The analysis unit ex112 restores the three-dimensional form of the entire facility or stadium with a precision that is sufficient to show a panorama view. Accordingly, the video information processing device ex101 can efficiently perform three-dimensional form restoration. As a result, a higher frame rate and a higher image quality can be attained for a free-viewpoint video of an area that a viewer wants to view.

Twelfth Modification

The video information processing device ex101 may save in advance three-dimensional form restoration data of a facility or a stadium which has been generated beforehand from design drawings or the like as a preparatory video. A preparatory video is not limited to this and may be virtual space data obtained by mapping, for each object, irregularities in space obtained from a depth sensor with a picture derived from a past video, a video at the time of calibration, or video data.

For example, in a case where soccer is being played in a stadium, the analysis unit ex112 may perform three-dimensional form restoration only on a player and the ball and combine obtained restoration data with the preparatory video to thereby generate a free-viewpoint video. Alternatively, the analysis unit ex112 may perform three-dimensional form restoration preferentially on a player and the ball. Accordingly, the video information processing device ex101 can efficiently perform three-dimensional form restoration. As a result, a higher frame rate and a higher image quality can be attained for a free-viewpoint video related to the player that the viewer pays attention and the ball. In a surveillance system, the analysis unit ex112 may perform three-dimensional form restoration only on a person and a moving object or preferentially on a person and a moving object.

Thirteenth Modification

The time set on each apparatus may be calibrated on the basis of the reference time of a server or the like when image capture starts. The analysis unit ex112 may perform three-dimensional form restoration by using, among a plurality of pieces of video data obtained by the plurality of cameras ex102, a plurality of pieces of video data obtained at times within a time range set in advance, in accordance with the precision of time setting. For detecting the times, the times when the obtained pieces of video data were saved in the saving unit ex111 are referred to, for example. Note that the method for detecting times is not limited to this. As a result, the video information processing device ex101 can efficiently perform three-dimensional form restoration. Accordingly, a higher frame rate and a higher image quality can be attained for a free-viewpoint video.

The analysis unit ex112 may perform three-dimensional form restoration by only using high-image-quality data or preferentially using high-image-quality data among a plurality of pieces of video data saved in the saving unit ex111.

Fourteenth Modification

The analysis unit ex112 may perform three-dimensional form restoration by using camera attribute information. In this case, the camera ex102 transmits captured video data and camera attribute information to the video information processing device ex101. Camera attribute information includes the image capture position, image capture angle, image capture time, zoom factor, and the like.

As a result, the video information processing device ex101 can efficiently perform three-dimensional form restoration. Accordingly, a higher frame rate and a higher image quality can be attained for a free-viewpoint video.

Specifically, the camera ex102 defines three-dimensional coordinates in a facility or a stadium and transmits to the video information processing device ex101 information indicating when an image of which location indicated by coordinates was captured by the camera ex102 from what angle with what zoom factor as camera attribute information together with the video. At the time of activation of the camera ex102, the clock of the communication network of the facility or the stadium is synchronized with the clock of the camera ex102, and time information is generated.

Figure 21:
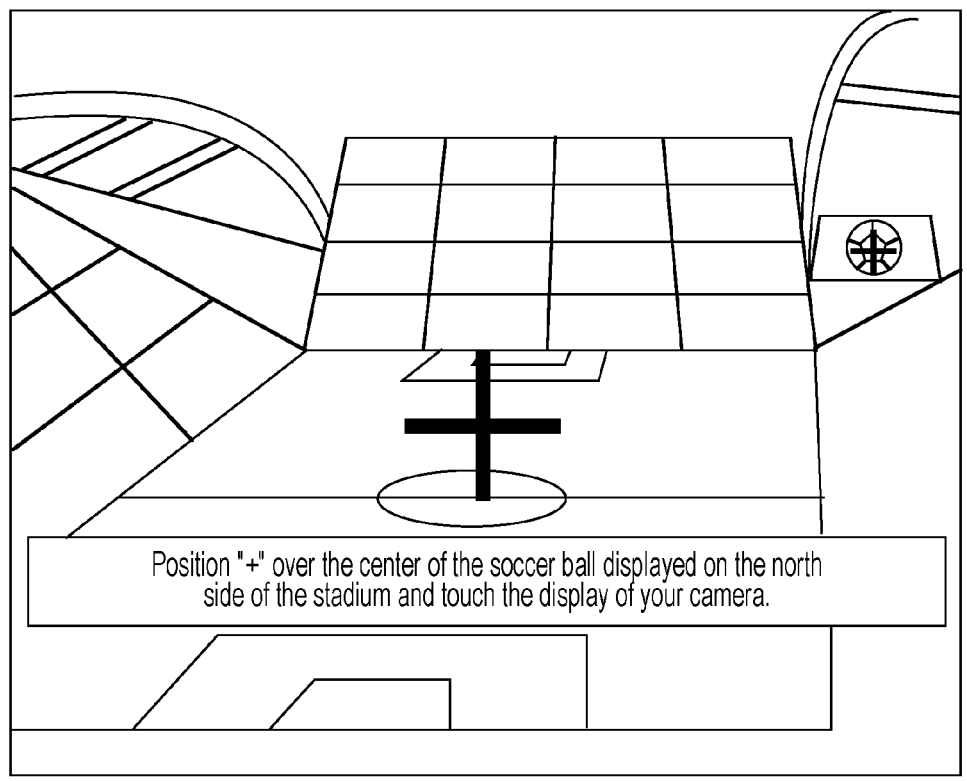
FIG. 21 is a diagram illustrating an example of a notification screen displayed upon start-up of a camera.

When the camera ex102 is oriented to a specific point in the facility or stadium at the time of activation of the camera ex102 or at any time, position information and angle information about the camera ex102 are obtained. FIG. 21 is a diagram illustrating an example of a notification displayed on the screen of the camera ex102 at the time of activation of the camera ex102. When the user positions the "+" sign displayed at the center of the screen over the "+" sign at the center of the soccer ball on a billboard placed on the north side of the stadium in accordance with the notification and touches the display of the camera ex102, the camera ex102 obtains vector information about a vector from the camera ex102 to the billboard and identifies the references of the camera position and angle. Thereafter, the camera coordinates and angle are identified at the time from motion information about the camera ex102. As a matter of course, the display is not limited to this, and display may be used in which the coordinates, the angle, the moving speed of the image capture area, or the like are indicated by arrows or the like during image capture.

The coordinates of the camera ex102 may be identified by using a radio wave of GPS, WiFi (registered trademark), 3G, Long Term Evolution (LTE), or 5G (wireless LAN) communication or may be identified by using short-range wireless communication, such as a beacon (Bluetooth (registered trademark) or ultrasound). Alternatively, information indicating at which base station in the facility or stadium captured video data has arrived may be used.

Fifteenth Modification

The system may be provided as an application that operates on a mobile terminal, such as a smartphone.

Accounts of various SNSs or the like may be used in logging in to the system. An account exclusively used for the application or a guest account having a limited function may be used. By using accounts in this way, favorite videos, favorite accounts, or the like can be rated. By preferentially assigning a band to video data similar to video data that is being obtained or viewed, video data corresponding to a viewpoint similar to that of video data that is being obtained or viewed, or the like, the resolution of such video data can be increased. As a result, three-dimensional form restoration from such a viewpoint can be performed with a higher precision.

When a user selects a favorite image or video and follows the counterpart in the application, the user can view the selected image more preferentially than other users or can form a connection with the counterpart through text chats or the like on the condition of agreement by the counterpart. As a result, a new community can be created.

As described above, when users are connected with one another in a community, image capture itself or sharing of captured images are actively performed, and three-dimensional form restoration with a higher precision can be promoted.

A user can edit an image or a video captured by another person or create a new collage image or video by using another person's image and the user's image in accordance with settings of connections in the community. As a result, new video works can be shared, that is, a new image or video can be shared only by people in the community, for example. The video works can be used for augmented reality (AR) games or the like by inserting a computer graphics (CG) character when editing an image or a video.

In the system, three-dimensional model data can be output at any time, and therefore, a 3D printer or the like owned by the facility can output a 3D object on the basis of three-dimensional model data corresponding to a characteristic scene, such as a goal scene. As a result, objects based on the scene in the game can be sold as souvenirs, such as key chains, or can be distributed to participating users. As a matter of course, an image from the best viewpoint can be printed as a usual photograph.

Sixteenth Modification

By using the above-described system, the general situation of the entire region can be managed by a center connected to the system on the basis of videos from onboard cameras mounted in police cars, wearable cameras of police officers, and the like, for example.

In a case of usual patrol, still images are transmitted and received every few minutes, for example. The center identifies a region where crimes are highly likely to occur on the basis of a crime map based on the result of an analysis using past crime data or the like, or retains regional data related to the probability of crime occurrence thus identified. For the identified region where crimes are highly likely to occur, images may be transmitted and received more frequently or images may be changed to moving images. Upon the occurrence of a crime, a moving image or three-dimensional reconfiguration data generated by using an SfM scheme may be used. When the center or each terminal simultaneously corrects an image or virtual space by using information from other sensors, such as depth sensors or thermo-sensors, police officers can grasp the situation more accurately.

The center can feed back information about an object of interest to a plurality of terminals by using three-dimensional reconfiguration data. As a result, the individuals having the terminals can track the object.

Currently, image capture from the air by using apparatuses capable of flying, such as quadcopters, drones, and the like, are performed for surveying buildings or environments or capturing vivid images of sports games or the like, or for other purposes. Although image capture with such autonomous moving apparatuses tends to have a problem of blurred images, it is possible to perform three-dimensional form restoration with an SfM scheme while correcting the blurs on the basis of the position and tilt. As a result, the image quality and the precision of space restoration can be increased.

In some countries, installation of onboard cameras that capture images of scenes outside the vehicles are required. Regarding such onboard cameras, the weather, the conditions of roads, the degree of traffic congestion, and the like in the direction of the destination can be grasped more accurately by using three-dimensional data that is modeled by using a plurality of images.

Third Embodiment

The processes described in the above-described embodiments can be easily implemented in a standalone computer system by recording a program for implementing the configuration of the image processing methods described in the embodiments to a storage medium. The storage medium may be any type of medium capable of storing the program, such as a magnetic disk, an optical disc, a magneto-optical disk, an IC card, or a semiconductor memory.

Hereinafter, examples of applications of the image processing methods described in the above-described embodiments and systems that employ the applications will be further described. The systems include apparatuses that employ the image processing methods. Other configurations in the systems can be changed as appropriate in accordance with the circumstances.

Figure 22:
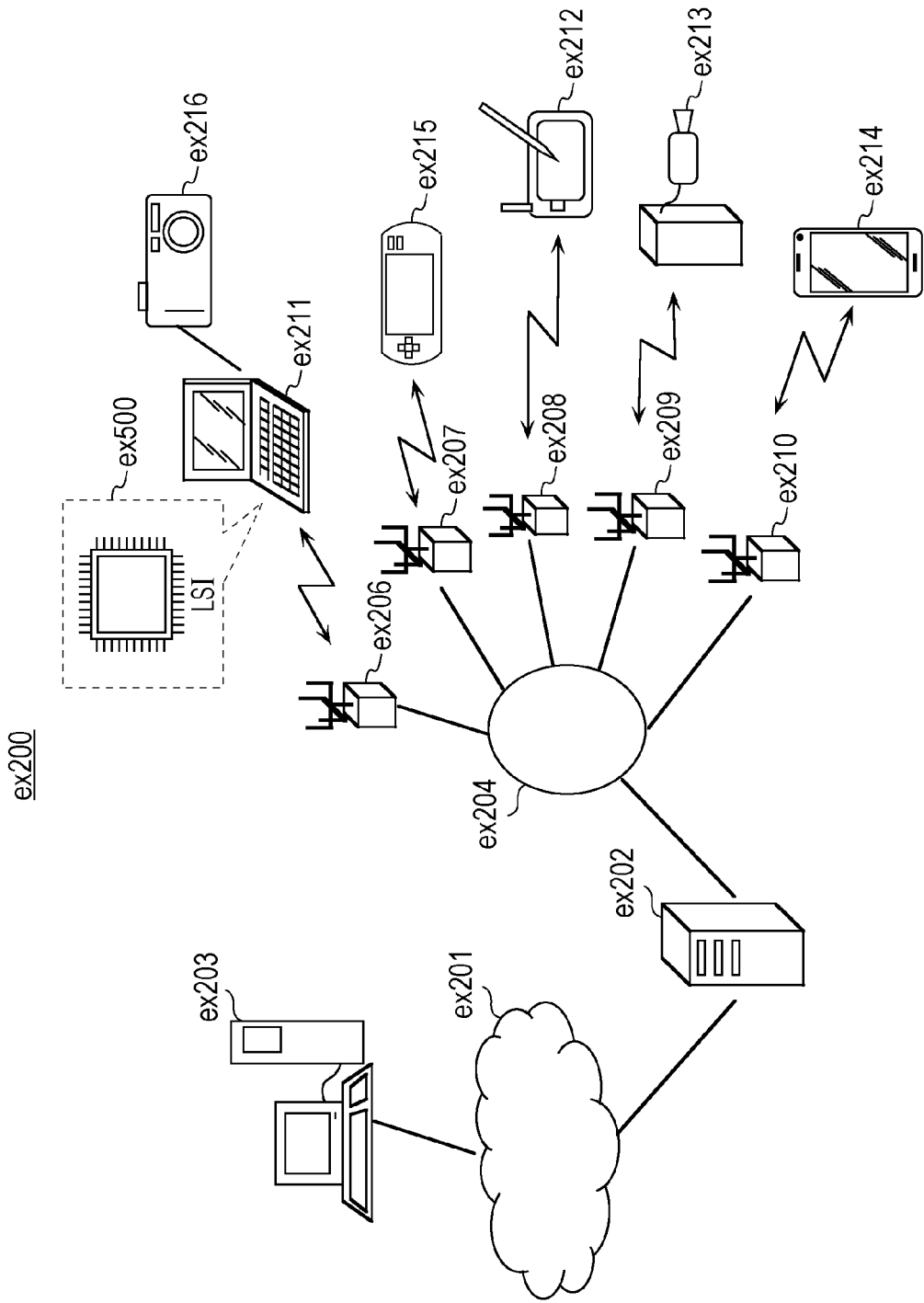
FIG. 22 is a diagram illustrating an overall configuration of a content supply system that implements a content delivery service.

FIG. 22 is a diagram illustrating an overall configuration of a content providing system ex200 that implements a content delivery service. An area in which a communication service is provided is divided into cells of a desired size. Base stations ex206, ex207, ex208, ex209, and ex210, which are fixed radio stations, are installed in the respective cells.

In the content providing system ex200, various devices, such as a computer ex211, a personal digital assistant (PDA) ex212, a camera ex213, a smartphone ex214, and a game machine ex215, are connected to the Internet ex201 via an Internet service provider ex202, a communication network ex204, and the base stations ex206 to ex210.

Note that the configuration of the content providing system ex200 is not limited to the configuration illustrated in FIG. 22, and any combination of the elements may be connected. Further, the individual devices may be directly connected to the communication network ex204, such as a telephone network, a cable television network, or an optical communication network, instead of via the base stations ex206 to ex210, which are fixed radio stations. Alternatively, the individual devices may be directly interconnected via short-range wireless communication or the like.

The camera ex213 is a device capable of capturing moving images, such as a digital video camera. A camera ex216 is a device capable of capturing still images and moving images, such as a digital camera. The smartphone ex214 may be any type of smartphone that complies with Global System for Mobile Communications (GSM) (registered trademark), Code Division Multiple Access (CDMA), Wideband-Code Division Multiple Access (W-CDMA), LTE, High Speed Packet Access (HSPA), or other communication schemes using a high-frequency band, a Personal Handyphone System (PHS) terminal, or the like.

In the content providing system ex200, the camera ex213 or the like is connected to a streaming server ex203 via the base station ex209 and the communication network ex204 to thereby enable live streaming. During live streaming, a coding process is performed on content (for example, a video of a music event or the like) obtained by the user capturing a video using the camera ex213, and the resulting content is transmitted to the streaming server ex203. The streaming server ex203 in turn delivers the transmitted content data as a stream to a client that has made a request. Examples of the client include the computer ex211, the PDA ex212, the camera ex213, the smartphone ex214, and the game machine ex215 capable of decoding the data that has undergone the coding process. Each device that has received the delivered data performs a decoding process on the received data and reproduces the data.

Note that the coding process may be performed on the obtained data by the camera ex213, by the streaming server ex203 that performs a data transmission process, or the coding process may be divided and the divided portions may be performed by the camera ex213 and the streaming server ex203 respectively. Similarly, the decoding process may be performed on the delivered data by the client, by the streaming server ex203, or the decoding process may be divided and the divided portions may be performed by the client and the streaming server ex203 respectively. In addition to still and/or moving image data obtained by the camera ex213, still and/or moving image data obtained by the camera ex216 may be transmitted to the streaming server ex203 via the computer ex211. In this case, the coding process may be performed by any of the camera ex216, the computer ex211, and the streaming server ex203, or the coding process may be divided and the divided portions may be performed by the camera ex216, the computer ex211, and the streaming server ex203 respectively. Regarding display of the decoded image, a plurality of devices connected in the system may display the same image in conjunction with one another, or a device having a large display unit may display an image of the entire view, and the smartphone ex214 or the like may enlarge and display a partial area of the image.

The coding and decoding processes are typically performed by an LSI ex500 included in the computer ex211 or in each device. The LSI ex500 may be formed of a single chip or a plurality of chips. Alternatively, software for moving image coding/decoding may be recorded to a recording medium (such as a compact disc read-only memory (CD-ROM), a flexible disk, or a hard disk) that is readable by the computer ex211 or the like, and the coding and decoding processes may be performed using the software. Further, in a case where the smartphone ex214 is equipped with a camera, moving image data obtained with the camera may be transmitted. This moving image data is data that has been coded by the LSI ex500 included in the smartphone ex214.

The streaming server ex203 may be constituted by a plurality of servers or a plurality of computers that process, record, and deliver data in a distributed manner.

As described above, the content providing system ex200 allows the client to receive and reproduce coded data.

Accordingly, the content providing system ex200 allows the client to receive, decode, and reproduce information transmitted by a user in real time, and therefore, allows a user having no special right or equipment to realize personal broadcasting.

Figure 23:
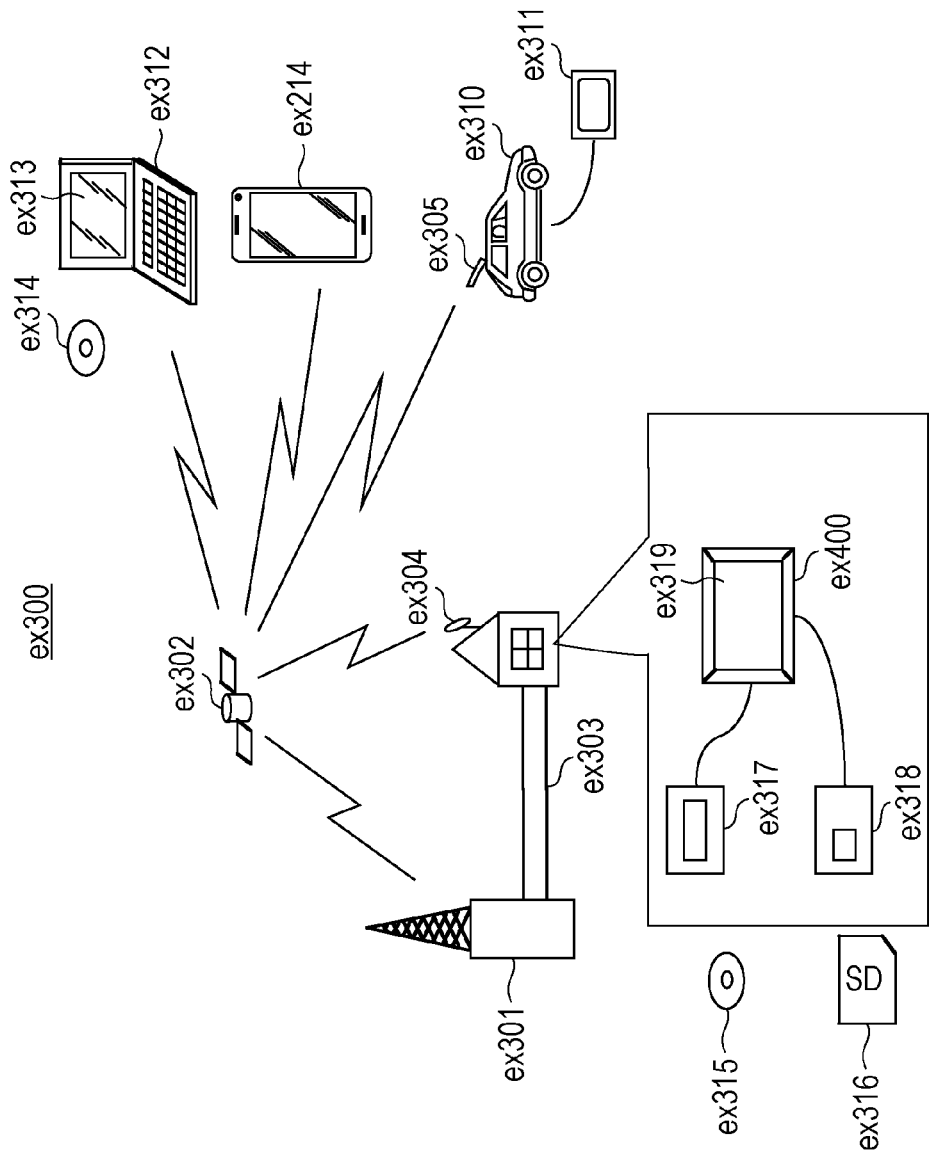
FIG. 23 is a diagram illustrating an overall configuration of a digital broadcasting system.

The above-described embodiments may be applied not only to the example of the content providing system ex200 but also to a digital broadcasting system ex300, as illustrated in FIG. 23. Specifically, a broadcasting station ex301 transmits multiplexed data obtained by multiplexing music data and the like with video data to a broadcasting satellite ex302 using a radio wave. The video data is data coded by using a moving image coding method. The broadcasting satellite ex302 that receives the data emits a broadcasting radio wave, and a home antenna ex304 capable of receiving satellite broadcasting receives the radio wave. A device, such as a television (receiver) ex400 or a set top box (STB) ex317, decodes and reproduces the received multiplexed data.

Further, a video decoding apparatus or a video coding apparatus can be implemented in a reader/recorder ex318 that reads and decodes multiplexed data recorded to a recording medium ex315, such as a digital versatile disc (DVD) or a Blu-ray disc (BD), or to a memory ex316, such as an SD card, or that codes a video signal, further multiplexes a music signal with the video signal depending on the circumstances, and writes the resulting signal to the recording medium ex315 or the memory ex316. In this case, the reproduced video signal is displayed on a monitor ex319, and the video signal can be reproduced by another apparatus or system using the recording medium ex315 or the memory ex316 having the multiplexed data recorded thereto. Alternatively, a video decoding apparatus may be implemented in the STB ex317 connected to a cable ex303 for cable television or the home antenna ex304 for satellite/terrestrial broadcasting, and the video may be displayed on the monitor ex319 of the television ex400. At this time, a video decoding apparatus may be incorporated into the television ex400 instead of the STB ex317.

Figure 24:
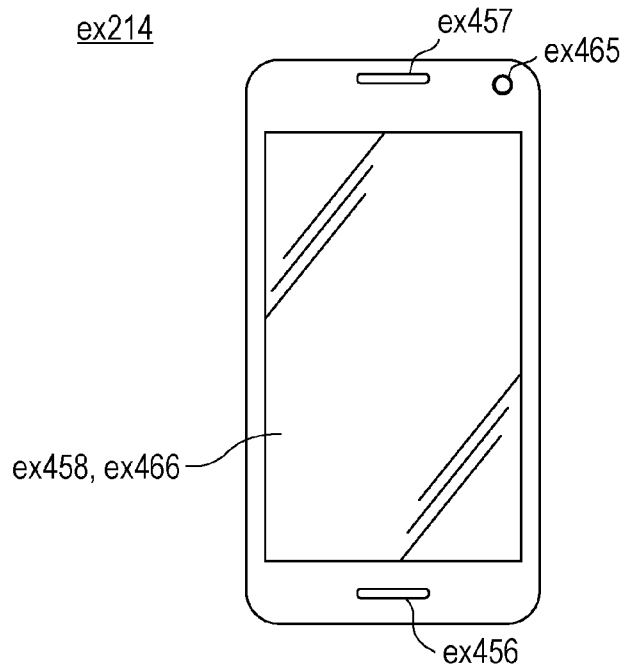
FIG. 24 is a diagram illustrating an example of a smartphone.
Figure 25:
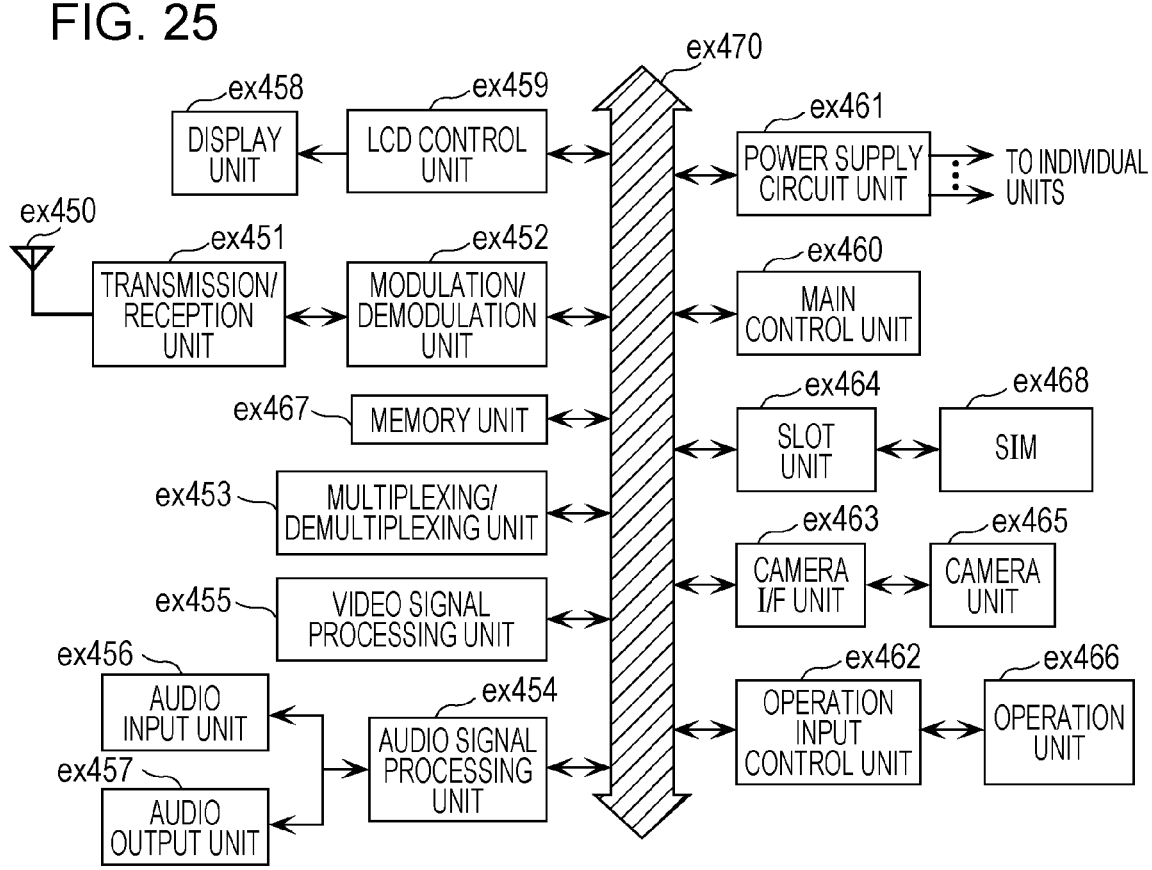
FIG. 25 is a block diagram illustrating an example of a configuration of the smartphone.

FIG. 24 is a diagram illustrating the smartphone ex214. FIG. 25 is a diagram illustrating an example of a configuration of the smartphone ex214. The smartphone ex214 includes an antenna ex450 that transmits and receives a radio wave to and from the base station ex210, a camera unit ex465 capable of capturing videos and still images, and a display unit ex458, such as a liquid crystal display (LCD), that displays the videos captured by the camera unit ex465 and data obtained by decoding videos or the like received via the antenna ex450. The smartphone ex214 further includes an operation unit ex466 such as a touch panel, an audio output unit ex457 such as a speaker for outputting sound, an audio input unit ex456 such as a microphone for inputting sound, a memory unit ex467 that stores coded data or decoded data of captured videos, captured still images, recorded sound, received videos, received still images, or received emails, and a slot unit ex464, which serves an interface with a subscriber identity module (SIM) ex468 for identifying the memory ex316 illustrated in FIG. 23 or a user and performing authentication for access to a network and various types of data.

The smartphone ex214 includes a main control unit ex460 that controls the display unit ex458 and the operation unit ex466 in an integrated manner. The smartphone ex214 also includes a power supply circuit unit ex461, an operation input control unit ex462, a video signal processing unit ex455, a camera interface unit ex463, an LCD control unit ex459, a modulation/demodulation unit ex452, a multiplexing/demultiplexing unit ex453, an audio signal processing unit ex454, the slot unit ex464, and the memory unit ex467 which are connected to the main control unit ex460 via a bus ex470.

When the on-hook/power key is turned on through a user operation, the power supply circuit unit ex461 supplies electric power to the individual units from a battery pack to thereby activate the smartphone ex214 into an operable state.

In the smartphone ex214, in a voice call mode, the audio signal processing unit ex454 converts an audio signal obtained by the audio input unit ex456 into a digital audio signal, the modulation/demodulation unit ex452 performs spread spectrum processing on the digital audio signal, and a transmission/reception unit ex451 performs digital-to-analog conversion processing and frequency conversion processing on the signal and thereafter transmits the resulting signal via the antenna ex450 in accordance with control performed by the main control unit ex460 which includes a CPU, a read-only memory (ROM), and a random access memory (RAM). Further, in the smartphone ex214, in the voice call mode, the transmission/reception unit ex451 amplifies reception data received via the antenna ex450 and performs frequency conversion processing and analog-to-digital conversion processing, the modulation/demodulation unit ex452 performs de-spread spectrum processing on the resulting signal, and the audio signal processing unit ex454 converts the resulting signal into an analog audio signal. Thereafter, the analog audio signal is output from the audio output unit ex457.

In a case where an email is transmitted in a data communication mode, text data of the email input through operation of the operation unit ex466 or the like is sent to the main control unit ex460 via the operation input control unit ex462. The main control unit ex460 performs control so as to make the modulation/demodulation unit ex452 perform spread spectrum processing on the text data and to make the transmission/reception unit ex451 perform digital-to-analog conversion processing and frequency conversion processing on the text data and thereafter transmit the resulting text data to the base station ex210 via the antenna ex450. In a case of receiving an email, substantially the opposite processing is performed on the received data, and the resulting data is output to the display unit ex458.

In a case where a video, a still image, or a combination of a video and sound is transmitted in the data communication mode, the video signal processing unit ex455 compresses and codes a video signal supplied from the camera unit ex465 by using a video coding method, and sends the coded video data to the multiplexing/demultiplexing unit ex453. The audio signal processing unit ex454 codes an audio signal obtained by the audio input unit ex456 while the video, still image, or the like is being captured by the camera unit ex465, and sends the coded audio data to the multiplexing/demultiplexing unit ex453.

The multiplexing/demultiplexing unit ex453 multiplexes the coded video data supplied from the video signal processing unit ex455 with the coded audio data supplied from the audio signal processing unit ex454 in accordance with a predetermined scheme. The modulation/demodulation unit (modulation/demodulation circuit unit) ex452 performs spread spectrum processing on the resulting multiplexed data. The transmission/reception unit ex451 performs digital-to-analog conversion processing and frequency conversion processing on the multiplexed data and thereafter transmits the resulting data via the antenna ex450.

In a case of receiving data of a moving image file linked to a website or the like or in a case of receiving an email attached with a video and/or sound in the data communication mode, the multiplexing/demultiplexing unit ex453 demultiplexes multiplexed data into a bitstream of video data and a bitstream of audio data in order to decode the multiplexed data received via the antenna ex450. The multiplexing/demultiplexing unit ex453 supplies the coded video data to the video signal processing unit ex455 and the coded audio data to the audio signal processing unit ex454 via the synchronization bus ex470. The video signal processing unit ex455 performs decoding using a video decoding method to thereby decode the video signal. Then, a video or a still image included in the moving image file linked to the website is displayed on the display unit ex458 via the LCD control unit ex459, for example. The audio signal processing unit ex454 decodes the audio signal, and the resulting sound is output from the audio output unit ex457.

The smartphone ex214 or other terminals may be implemented in three forms, that is, a transmission/reception terminal including both an encoder and a decoder, a transmission terminal only including an encoder, and a reception terminal only including a decoder, similarly to the television ex400. Although the case has been described where multiplexed data in which music data and the like is multiplexed with video data is received and transmitted in the digital broadcasting system ex300, the multiplexed data may be data in which text data related to the video other than audio data is multiplexed, or video data alone may be used instead of the multiplexed data.

The present disclosure is not limited to the above-described embodiments, and various modifications and alternations can be made without departing from the scope of the present disclosure.

The present disclosure is applicable to a video delivery system that delivers videos captured by a plurality of cameras.

The invention claimed is:

1. A method comprising:
    receiving, by a terminal and from a server, a video signal for successively replaying a set of videos selected from among a plurality of videos, the selected videos being respectively selected for each of a plurality of periods in accordance with rating values of the plurality of videos, the rating values being given by a plurality of users, the plurality of videos being obtained by taking an identical scene from a plurality of different viewpoints over a plurality of successive periods;
    successively replaying, by the terminal, the selected videos in accordance with the video signal;
    displaying, via a display connected to the terminal, any video among the plurality of videos; and
    displaying, via the display when any subject is selected by a user during the displaying of the video from among a plurality of subjects included in the displayed video, a menu for rating the selected subject, wherein an evaluation value of the selected subject is inputted by the user via the menu in the rating.

2. The method according to claim 1, wherein
    each of the rating values is a rating value of each of the plurality of videos, and
    each of the selected videos is a video
        that is selected from among the plurality of videos for each period among the plurality of periods, and
        that has a highest rating value or a rating value higher than a predetermined value in a corresponding period.

3. The method according to claim 1, wherein
    each of the rating values is a rating value of each of a plurality of subjects included in the plurality of videos,
    each of the selected videos is a video selected from among the plurality of videos for each of the plurality of periods, and
    in each of the selected videos, a subject having a highest rating value or having a rating value higher than a predetermined value is visible.

4. The method according to claim 1, wherein
    in the displaying of the video, a subject having a highest rating value or having a rating value higher than a predetermined value is highlighted and displayed among the plurality of subjects included in the displayed video.

5. The method according to claim 1, further comprising:
    displaying, via the display when any subject is selected by a user from among the plurality of subjects included in the displayed video, a list of videos for the plurality of periods among the plurality of videos, the videos in the list including the selected subject having rating values higher than a predetermined value.

6. The method according to claim 1, further comprising:
    displaying, via the display when any subject is selected by a user from among the plurality of subjects included in the displayed video, a tracking video that is a video generated by connecting together the plurality of videos for tracking the selected subject.

7. The method according to claim 1, further comprising:
    displaying, via the display, an output screen that includes a first screen and a second screen smaller than the first screen, the first screen displaying any of the plurality of videos, and the second screen displaying the plurality of selected videos that are replayed; and
    displaying, via the display when the second screen is selected by a user, the plurality of selected videos on the first screen.

8. The method according to claim 1, wherein
    each of the rating values is a rating value of each of the plurality of videos, and
    each of the selected videos is a video
        that is selected from among the plurality of videos for each period among the plurality of periods, and
        that has a rating value lower than a predetermined value in a corresponding period.

9. The method according to claim 1, wherein the set of videos selected to be successively replayed in accordance with the video signal includes a portion of a video of a first viewpoint and a portion of a video of a second viewpoint different from the first viewpoint.

10. The method according to claim 9, wherein the portion of the video of the first viewpoint and the portion of the video of the second viewpoint included in the set of videos have target rating values.

11. The method according to claim 1, wherein the plurality of different viewpoints includes a first viewpoint and a second viewpoint different from the first viewpoint, and
    wherein the first viewpoint is closer to at least one of the plurality of subjects than the second viewpoint.

12. The method according to claim 1, wherein, in the rating, a selection is made among a plurality of evaluation choices as the evaluation value, the selection being made by the user via the menu to evaluate the selected subject.

13. The method according to claim 1, further comprising:
receiving another video signal instead of a selected video signal when the selected video signal has an amount of data larger than an upper limit based on a reception band of the terminal,
wherein each of a plurality of viewpoints of videos of the other video signal is closer to the subject than each of a plurality of viewpoints of the selected videos.

14. A terminal device comprising:
a processor; and
a memory having stored therein instructions which, when executed by the processor, cause the processor to perform operations comprising:
receiving, from a server, a video signal for successively replaying a set of videos selected from among a plurality of videos, the selected videos being respectively selected for each of a plurality of periods in accordance with rating values of the plurality of videos, the rating values being given by a plurality of users, the plurality of videos being obtained by taking an identical scene from a plurality of different viewpoints over a plurality of successive periods;
successively replaying the selected videos in accordance with the video signal;
displaying, via a display connected to the terminal, any video among the plurality of videos; and
displaying, via the display, when any subject is selected by a user during the displaying of the video from among a plurality of subjects included in the displayed video, a menu for rating the selected subject, wherein an evaluation value of the selected subject is inputted by the user via the menu in the rating.

15. A method, performed by a terminal, comprising:
displaying subjects on a display of the terminal;
displaying a first display content on the display for a user to input, via an input interface corresponding to the first display content, an evaluation value of a subject out of the subjects if the subject is selected by the user while the subjects are displayed on the display;
transmitting the evaluation value to a server;
receiving, from the server, a first video generated by the server, the first video being generated by time-dividing and connecting second videos such that the first video includes connected second videos that are successively arranged in time series to successively show a first subject out of the subjects, the first subject having a first evaluation value greater than a second evaluation value of a second subject out of the subjects, the second videos having different viewpoints and a same shooting period; and
replaying the first video.

16. The method according to claim 15, wherein the first video is generated such that a first display area of the first subject is larger than a second display area of the second subject.

17. The method according to claim 15, wherein the first evaluation value is a highest evaluation value.

18. The method according to claim 15, wherein the first display content includes a menu for the user to select the evaluation value from among predetermined values.

19. A method, performed by a server, comprising:
receiving evaluation values of subjects from terminals, the evaluation values being input by users of the terminals via input interfaces corresponding to first display contents displayed on displays of the terminals;
generating a first video by time-dividing and connecting second videos such that the first video includes connected second videos successively arranged in time series to successively show a first subject out of the subjects, the first subject having a first evaluation value greater than a second evaluation value of a second subject out of the subjects, the second videos having different viewpoints and a same shooting period; and
transmitting the first video to the terminals.

20. The method according to claim 19, wherein the first video is generated such that a first display area of the first subject is larger than a second display area of the second subject.

21. The method according to claim 19, wherein the first evaluation value is a highest evaluation value.

22. The method according to claim 19, wherein the connected second videos include a video having a first viewpoint and a video having a second viewpoint different from the first viewpoint.

* * * * *